United States Patent
Wilkinson et al.

(10) Patent No.: US 7,190,661 B2
(45) Date of Patent: *Mar. 13, 2007

(54) CONFIGURATION OF THREE-DIMENSIONAL FEATURES IN DATA RECORDING STRUCTURES

(75) Inventors: Richard L. Wilkinson, Whittier, CA (US); John H. Rilum, Tustin, CA (US); Carlyle J. Eberly, Huntington Beach, CA (US); John R. Holmes, Garden Grove, CA (US)

(73) Assignee: Optical Disc Corporation, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/078,547

(22) Filed: Mar. 11, 2005

(65) Prior Publication Data

US 2005/0157628 A1    Jul. 21, 2005

Related U.S. Application Data

(60) Continuation of application No. 10/384,471, filed on Mar. 7, 2003, now Pat. No. 7,102,991, which is a division of application No. 09/558,071, filed on Apr. 26, 2000, now Pat. No. 6,570,840.

(51) Int. Cl.
  *G11B 7/24* (2006.01)
(52) U.S. Cl. .............................. 369/275.1; 369/275.4
(58) Field of Classification Search ............. 369/275.1, 369/275.4; *G11B 7/24*
  See application file for complete search history.

(56) References Cited

U.S. PATENT DOCUMENTS

| | | | |
|---|---|---|---|
| 4,209,804 A | 6/1980 | Dil ........................... | 358/128.5 |
| 4,230,915 A | 10/1980 | Dil et al. ............. | 179/100.1 G |
| 4,270,130 A | 5/1981 | Houle et al. ................. | 346/77 |
| 4,306,013 A | 12/1981 | Roach et al. ............... | 369/288 |
| 4,308,337 A | 12/1981 | Roach et al. ............... | 430/296 |
| 4,380,769 A | 4/1983 | Thomas et al. .......... | 346/135.1 |
| 4,613,966 A | 9/1986 | Di Stefano et al. ......... | 369/100 |
| 4,646,103 A | 2/1987 | Sugiyama et al. ........... | 346/1.1 |
| 4,719,615 A | 1/1988 | Feyrer et al. ............... | 369/284 |
| 4,809,022 A | 2/1989 | Wilkinson et al. ........ | 346/135.1 |
| 4,852,075 A | 7/1989 | Feyrer et al. ............... | 369/100 |
| 4,896,313 A | 1/1990 | Hirose et al. ............... | 369/275 |
| 4,912,696 A | 3/1990 | Feyrer et al. ............... | 369/100 |
| 4,963,901 A | 10/1990 | Wilkinson et al. ........ | 346/76 L |
| 5,088,086 A | 2/1992 | Van et al. .................... | 369/100 |
| 5,099,469 A | 3/1992 | Dobbin et al. ................ | 369/58 |
| 5,218,591 A | 6/1993 | Shimamoto et al. .......... | 369/54 |
| 5,283,159 A | 2/1994 | Norton et al. .............. | 430/275 |
| 5,297,129 A | 3/1994 | Wilkinson et al. .......... | 369/116 |

(Continued)

FOREIGN PATENT DOCUMENTS

EP    0837454 A2    4/1998

*Primary Examiner*—A M Psitos
(74) *Attorney, Agent, or Firm*—Stephen J. Koundakjian; Charles W. Fallow

(57) ABSTRACT

Improvements in the shape of three-dimensional features displayed in optical recording structures, particularly in such structures displaying features of differing dimensional characteristics. The shape improvements include reductions in berm height and width, dual level data marks and tracking guides, and land areas projecting above or into the surface of the recording structure.

14 Claims, 14 Drawing Sheets

U.S. PATENT DOCUMENTS

| | | | |
|---|---|---|---|
| 5,304,455 A | 4/1994 | van Liempd | 430/270 |
| 5,316,814 A | 5/1994 | Sawada et al. | 428/64 |
| 5,459,712 A | 10/1995 | Sugaya et al. | 369/275.4 |
| 5,608,711 A | 3/1997 | Browne et al. | 369/116 |
| 5,608,712 A | 3/1997 | Rilum et al. | 369/116 |
| 5,741,627 A | 4/1998 | Cubit et al. | 430/321 |
| 5,926,446 A | 7/1999 | Shimizu | 369/44.26 |
| 6,013,316 A | 1/2000 | Cubit | 427/240 |
| 6,022,604 A | 2/2000 | Del Mar et al. | 428/64.1 |
| 6,212,158 B1 | 4/2001 | Ha et al. | 369/275.4 |
| 6,285,638 B1 | 9/2001 | Konishi et al. | 369/47.19 |
| 7,102,991 B2 * | 9/2006 | Wilkinson et al. | 369/275.4 |
| 2003/0147326 A1 * | 8/2003 | Wilkinson et al. | 369/59.25 |

\* cited by examiner

CONFIGURATION OF THREE-DIMENSIONAL FEATURES IN DATA RECORDING STRUCTURES

CROSS REFERENCE TO RELATED APPLICATIONS

This is a continuation of U.S. patent application Ser. No. 10/384,471, filed Mar. 7, 2003 now U.S. Pat. No. 7,102,991, which is, in turn, a divisional of U.S. patent application Ser. No. 09/558,071, filed Apr. 26, 2000 and now issued as U.S. Pat. No. 6,570,840.

BACKGROUND OF THE INVENTION

1. Field of the Invention

This invention relates to digital optical recording and retrieval from data storage structures. More specifically it relates to three-dimensional mark, land and tracking guide configurations for improved Figure of Merit, and to methods and apparatus for production thereof.

2. Description of Prior Art

Information storage and retrieval employing a spinning disc upon which digital data (representing documents, software, music, images and other types of information) are recorded, and from which data are retrieved by means of one or more optical beams impinging on the surface of the disc (or a "daughter" disc produced from a disc master), is well known in the art. Likewise well known are other structures upon which digital data are optically recorded and from which the data are retrieved, including cylinders and cards. Optical recording on multi-layered data "wafers," from which data are selectively extracted by scanning or other means essentially free of moving parts, can easily be anticipated in the relatively near future, as well as other sophisticated structures for ultra large-scale optical data storage and selective retrieval.

While each such type of structure might be separately addressed in this discussion, it is believed that the concepts discussed can be more clearly addressed with particular emphasis on essentially planar, disc-shaped structures, upon which data are recorded and from which data are retrieved while the discs are spinning about a central axis. From time to time, reference may be made to these other structures in connection with the invention disclosed herein, whose application and embodiments are by no means limited to discs.

A number of commonly employed disc-based optical data recording methods exist, each proceeding on a fundamentally different physical basis, and various implementation variations exist within each method. However, these optical disc recording methods have a number of features in common. For example, they all utilize a spinning, disc-shaped storage structure upon whose surface (or surfaces, or layers) one or more spiral data tracks are imposed. In some applications, there may be only one continuous track on the particular surface; in others there are a plurality of tracks, each occupying an annulus on that disc surface. Of course, in essentially rectangular optical recording structures, such as cards and data wafers, the tracks would likely constitute approximately parallel lines of data marks.

Each data track comprises a succession of a great number of microscopic marks interspersed by unmarked, or differently marked, areas commonly designated as "lands." The track pitch (i.e., the radial distance between the longitudinal axes of adjacent, essentially circular track portions) is microscopic, as is the length and width of each of the marks. Accordingly, a data track on a disc surface may be thought of as a large number of closely spaced essentially circular pathways, each containing a great many data marks and intervening lands in succession. In some applications, a particular data track or track portion might not be completely circular, in the sense that it might occupy only an arc of a circle on the disc. However, in this discussion arcuate and circular data tracks or portions of tracks will be referred to interchangeably as being circular data tracks. Since the circumference of each of these essentially circular pathways is very great, in comparison to the dimensions of the marks and lands, a small succession of marks and intervening lands will appear to be a linear (i.e., straight line) sequence at the microscopic level. Accordingly, at the microscopic level, radially adjacent data tracks on the disc may be viewed as essentially parallel lines of data, each containing a longitudinal succession of linear marks and lands, although at the macroscopic level they are essentially concentric circular paths.

The disc is normally written (i.e., recorded) and read by rotating it rapidly on a motor-driven spindle. Tracking—maintenance of the radial position of the write beam and/or the read beam precisely in the center of the data track—is accomplished through a servo apparatus that compares at least a single pair of continuous readings. Each reading in the pair is taken on opposite sides of the longitudinal axis of the track. Based on these readings, the servo continuously adjusts the radial position of the beam to cause the readings on opposite sides of the track to be equal. This condition occurs when the beam is focused precisely upon the longitudinal axis of the track, i.e., when the two reading points are equidistant from the track axis. The sensing method will, of course, depend on the particular optical data recording method employed.

Tracking may be accomplished with a single beam—the read beam or the write beam, depending on which operation is being tracked. Here, the reflected beam is optically split into a data retrieval beam (or write monitoring beam, in direct-read-after-write—DRAW-applications) and a tracking beam. In CD and DVD-R applications, the reflected tracking beam component of essentially circular cross-section is divided into two equal semi-circles, the dividing line between them being parallel to the longitudinal track axis. The tracking sensor continuously compares the intensity of the two halves of that image, and a servomechanism adjusts the radial position of the beam to cause the sensed light in both halves to be equal. The latter condition indicates that the readings are being taken from the center of the track axis, i.e., that proper tracking is occurring.

Generally, the same sensor is employed for tracking and for data retrieval (or write monitoring). In single-beam ("push-pull" or "PP") CD tracking, one of the two sensed components is subtracted from the other, and a zero difference (i.e., equal input from both sides) indicates proper tracking. Data retrieval (or write monitoring) is accomplished by adding the two halves.

In DVD-ROM applications, differential phase tracking is employed, in which the reflected light is divided into four quadrants and the phasing of each is compared to determine tracking condition.

Most CD playback devices employ triple-beam data retrieval tracking (although the "Red Book" only prescribes standards for single-beam, PP tracking). In triple-beam tracking, the read beam is split into three beams, the read beam itself, a first tracking beam directed one or more mark lengths ahead of it and offset ¼ of the track pitch (approximately ¾ mark width) to one side, and the second tracking beam directed one or more mark lengths behind the read beam and offset ¼ of the track pitch to the other side. Each of the two tracking beam reflections is individually sensed continuously for tracking, in the manner described above in respect to PP tracking.

Beam focusing is likewise accomplished through a suitable feedback mechanism. Beam focusing is commonly employed and well known in the art, and therefore need not be further described except as may be necessary to describe particular applications.

The specifics of optical data recording, retrieval and tracking depend on which type of optical data recording is being considered. Accordingly, to understand optical data recording and retrieval, and to further understand tracking—and the present invention—it is important first to consider the various optical data recording methods commonly in use, with particular attention to those aspects of data retrieval and tracking pertaining to the present invention and its various embodiments and applications.

The most commonly employed optical data recording methods fall into four categories.

In Magneto-Optic ("MO") data recording, the general purpose is to store erasable data files on a disc for archival purposes, e.g., in computer hard drives. In MO recording, the disc's recording surface is comprised of one or more thin metallic-alloy layers having specific magneto-optic properties, which are sandwiched between thin dielectric and non-magnetic metallic layers. Together these layers comprise the MO data disc's recording surface. This recording surface is normally applied onto a polymeric substrate, as discussed below.

The recorded marks that correspond to a binary pulse-length modulated waveform (i.e., the physical representation of the digital data to be recorded) are essentially two-dimensional. This is because these marks are produced in only one of the MO disc's magnetic film layers, which usually has a thickness of only ~0.05 microns (one micron being one thousandth of a millimeter), or less. The unrecorded MO disc is pre-grooved, i.e., the polymeric substrate upon which the disc's recording surface is laid possesses a continuous, three-dimensional spiral groove having a width of ~0.5 micron, upon which the track(s) of data marks in the recording surface will be formed. This pre-groove may be created in the unrecorded MO disc substrate by molding it from a stamper made from a disc master. The disc master, in turn, may be produced by a number of methods, including the PR and dye-polymer methods, which will be discussed below. The cross-sectional shape of the grove is a matter of choice, most being essentially trapezoidal. The track pitch is normally ~1.2 microns. During recording and subsequent playback of a recorded MO disc, the tightly-focused recording and reading beam spots "follow" this pre-groove by PP tracking.

A spatial replica of the temporal binary pulse-length modulated waveform that physically represents digital data is recorded on an MO disc in the following way: The material comprising the thin magnetic storage layer in an MO disc is selected to have two stable orientations: "up" or "down" relative to the surface of the storage layer. Since the magnetic medium "coats" the entire disc surface, including all surfaces within the grooved track, the actual direction of the magnetic orientation depends on where it is measured, although it is always perpendicular to each surface. An up-magnetized microscopic region (mark) normally corresponds to a high voltage pulse of the binary data signal being recorded, where the down-magnetized region then corresponds to a low voltage portion. Of course, the up and down magnetic orientations can be reversed in data significance, where down-magnetized marks represent high voltage pulses and up-magnetized marks represent low voltage portions.

An MO disc is initially prepared in a single magnetization state. In other words, the entire disc surface is initially in one of the two stable, mutually opposed magnetization states. Recording therefore consists of selectively "switching" the magnetization of spaced-apart, constant-width, elongated microscopic regions of the thin magnetic recording layer lying within the pre-grooved track in the disc's surface. These switched regions within the pre-grooved spiral track are the recorded marks. The interspersed regions within the groove that are not switched (relative to the initial state)—i.e., which remain in their initial magnetization state—are the lands.

Once recorded, the marks and intervening lands are read by means of a narrowly focused beam of light, normally from a laser source. Linearly polarized playback light that is reflected from a microscopic up-magnetized region of the recorded surface will be rotated in a clockwise direction, and the light reflected from a down-magnetized region will be rotated in a counter-clockwise direction. By detecting the polarization rotation in the light reflected from the disc, the read mechanism determines the magnetization orientation of the mark currently being read by the focused reading light spot, and thus retrieves the data value ("0" or "1") of that mark.

Unlike MO data retrieval, which depends on detection of polarization rotation, MO tracking employs purely optical PP mechanisms, based on comparison of the intensity of reflected light detected in two halves of the reflected image from the tracking groove. The read beam is moved radially (relative to the disc) until the two halves detect the same reflected intensity, as discussed above.

Each mark written in the pre-grooved track of the storage layer of an MO disc comprises a large number of extremely minute magnetic domains that have the same magnetic orientation, which coalesce into the relatively larger microscopic domain comprising the recorded mark. The magnetic orientation of these minute magnetic domains within a given mark is set by an external magnetic field that exceeds the thin magnetic storage film's coercivity. Accordingly, the magnetization of a domain in the thin magnetic film will align with the force lines of a sufficiently strong external field, if that external field is in one of the two stable magnetization directions of the film. The magnetic-alloy materials that comprise the data storage layers of MO discs have magnetic coercivities that are extremely temperature dependent in a non-linear manner. In fact, at room temperature—indeed, at any temperature below the Curie temperature of the magnetic alloy used to form the storage layer (the Curie temperature is generally in the range of 200 to 300 degrees centigrade for the magnetic alloys commonly employed in MO discs)—unattainably large external magnetic fields would be required to switch the magnetic orientation of the storage layer's domains. However, if the magnetic storage layer's temperature is raised to its Curie temperature (or slightly above it), a very small external field can re-orient the magnetization direction of the tiny magnetic domains.

Therefore, to record MO marks, i.e., to orient the minute domains of the thin magnetic storage layer in an elongated region of the pre-groove on the data surface of the MO disc, a tightly focused spot of light is employed to locally heat the thin magnetic-alloy storage layer to just above its Curie temperature, while simultaneously applying a relatively small external magnetic field that is oriented either up, or down, relative to the plane of the disc. Causing current selectively to flow briefly in either of two directions through a nearby coil of wire that is wound parallel to the plane of the disc can create this controllable external magnetic field. Thus, the focused recording light spot merely serves to define the region of the pre-groove that may be affected (i.e., have its magnetization re-oriented) by the relatively small external magnetic field. Accordingly, it is the external magnetic field—not the focused light beam—that actually forms the mark in the storage layer of the MO disc.

Once again, the material comprising the storage layer is selected so that the imposed magnetic orientation on all surfaces within the pre-grooved track is "up," relative to each surface, if the orientation of the external magnetic field is "up," and vice versa. In all cases, the magnetic orientation is perpendicular to each such surface.

Because it depends on use of a light beam to locally elevate the temperature of the recording medium, in order to cause a small domain in the medium surface to exceed its Curie temperature, the MO method of optical data recording may be classified as a thermal optical data recording method. In other words, it is not the quantity of light, per se, that causes the desired effect; it is the heat locally generated within the surface of the medium that facilitates magnetic-orientation switching by quickly raising a small area of constant width above the Curie temperature of the material, so that the relatively small external magnetic field can effect the desired switching. Since the disc is rapidly revolving during the process, the created mark becomes elongated so long as the light beam remains on (and the magnetic field orientation is maintained). Thus, switching of the orientation of the external magnetic field, to represent the temporal binary data, in coordination with the application of the heat-producing light beam to selectively raise a group of domains in the surface to above the Curie temperature of the material, creates marks of selective length and magnetic orientation, interspersed with marks of selective length and opposite magnetic orientation. The width of the marks is determined by the beam width (see, below), and the width of the pre-groove is selected accordingly, in a manner familiar to those with ordinary skill in the art.

An MO data disc recording can be written and re-written as desired, and this feature is, of course, utilized in computer hard drives. Once the MO disc is written, the focused recording spot can be made to scan any desired segment(s) of the data track(s) while the power level of the light in the spot is maintained at a level sufficiently high to raise the recording medium to above its Curie temperature, while the external magnetic field strength and direction are maintained constant. This will erase any desired segment(s) of disc track(s) by uniformly re-orienting all the domains within such track segment(s) in a single direction (say, "up"). Once erased, the segment(s) may be re-written in the manner described above. This erase/re-write procedure can be—and normally is—applied in a continuous manner, to completely "write over" any desired portion of the MO data disc. There are many sophisticated methods of accomplishing this, which are commonly applied and well known in the art (particularly in reference to data storage on computer hard drives), but which are not directly relevant to the present discussion.

Since the magnetic storage layer employed in MO discs is quite thin, the in-plane thermal heat diffusion in this layer will be large relative to diffusion in the perpendicular direction. Furthermore, because this layer has some finite heat capacity, it takes time for the film to cool after it is heated to its Curie temperature. Therefore, a magnetically switched region in the thin MO storage layer will continue to lengthen (since the disc is spinning) after it has passed beneath the focused recording spot, since the layer remains exposed to the coercive force of the less tightly focused external magnetic field. To minimize such residual domain growth (which is commonly referred to as domain "bloom"), an MO disc may incorporate a metallic heat sink layer (which doubles as a light reflector) that is located close to the magnetic storage layer. This heat sink layer will pull heat out of the storage layer and thereby increase its cooling rate. Also, since the transverse extent of the formed mark is limited by the pre-groove's sidewalls, bloom is mostly a problem in the longitudinal (along the track) direction. Therefore, it chiefly affects the correct length and "duty cycle" (ratio of mark to mark-plus-land length) of the written marks.

Since the magnetic storage layer in an MO disc is quite thin, heating to the Curie temperature begins to occur almost immediately upon switching the laser beam to its "on" position. And because of the heat sink, the temperature of the medium almost immediately cools to below its Curie temperature when the beam is switched "off." However, in practice the leading end of an MO mark is normally narrower, in plan view, than its trailing end. This is because—noting the fact that the disc is rapidly rotating while mark writing occurs—a small amount of time is required to bring the leading end to the Curie temperature, while the heat sink insures that virtually no time at all is required to cool the trailing end to below the Curie temperature. Since accurate data retrieval ordinarily depends on detection of the mark-land transitions, this means that the leading end of a mark should have nearly the same shape as its trailing end, so that the mix of "up"-"down" orientation in each transitional area (i.e., the leading and trailing regions of the marks) may be defined and consistent.

Accordingly, the literature is replete with proposed methods to cause the leading ends of MO marks to have the same shape as their trailing ends. All of these appear to proceed on the principle that by boosting the beam intensity at the leading end of the mark, it can be blunted to a shape that essentially constitutes a mirror image of the already blunt trailing end. This is accomplished by various stratagems, by which each data pulse is first processed to produce a final write laser drive pulse having increased amplitude at its leading edge, to yield a laser intensity boost at the leading end of the mark. Typically, this is accomplished by adding a ramp or step at the leading edge of each corresponding, essentially rectangular data pulse.

The Phase Change ("PC") method of optical data recording is another means by which erasable data storage discs may be produced, typically in CD-RW (write/re-write) applications. Here, the disc contains a layer of substance whose structural phase (crystalline or amorphous) is changed by heat generated within its recording surface by a laser beam impinging on it. The phase state of a tiny region of the disc surface—whether crystalline or amorphous—determines its optical characteristics, which are read optically to retrieve each datum thus recorded. The phase change method is fairly adiabatic, and, as in the MO method, excess heat is normally carried away by layers sandwiching the medium in which the data marks are created.

While PC, like MO, is a thermal optical data recording method, PC differs markedly from the MO method in that (1) in PC, it is the light beam, itself, that writes and erases the data marks, and (2) PC involves two thermal thresholds. There is one threshold for the "erase" mode and another, higher one, for the "write" mode. These thresholds cannot be directly measured, as perhaps theoretically possible in the case of the temperature at an MO recording surface. Rather, they must be determined on the basis of many factors, such as the intensity of the light beam impinging on the surface, the rotational speed of the disc, the chemical and physical parameters of the recording surface, ambient conditions and other factors.

To write a PC mark—i.e., a single datum or set of data, depending on the data modulation method employed—into the medium, it is necessary to that tiny region sufficiently to cause the material in that region to exceed its write threshold temperature and thus to change from its initial crystalline phase into an amorphous phase. This is accomplished essentially by melting it and then allowing it to solidify quickly in the new amorphous (i.e., data) phase. To control the shape of the mark, the laser heat must be removed very quickly to prevent re-formation of the crystal phase (which characterizes lands). This is normally accomplished by causing each laser drive pulse to comprise a rapid succession of narrow pulses, each resulting in very brief laser light impact on the disc surface as it revolves. This succession of brief, intermittent pulses within each data pulse collectively creates the elongated microscopic mark. The sandwiching layers serve to withdraw any residual heat.

To erase a mark, the elongated microscopic region of the data track constituting it must be returned to its crystalline state. This, too, is accomplished by heating the region quickly. However, in the erase mode the region is allowed to cool more slowly, so that the crystalline structure can develop. Once again, this is normally accomplished by a rapid succession of laser pulses, which, in the erase mode, have a lower power level than in the write mode because the erase threshold is lower than the write threshold. The relative configuration and spacing of the narrow pulses comprising the erase pulse may be different than those within the write pulse, and the literature suggests many pulse designs that hopefully accomplish each respective purpose.

The marks created by the PC method, like those of the MO method, extend along a data track, because the disc is rapidly rotating while the laser beam switches between "on" and "off" conditions. The duration of the laser beam pulse (i.e., the total duration of the particular set of narrow pulses comprising a single collective pulse) determines the length of the resulting mark (amorphous state) or intervening land (crystalline state). In some applications, CD-RW among them, the unrecorded disc is provided with a spiral tracking groove extending around the disc.

Like MO, PC normally employs ordinary PP tracking. In those applications in which the unrecorded disc is provided with a spiral groove—similar to the tracking groove in MO discs, and formed by similar methods, as discussed above— tracking consists in causing the read beam to follow the central axis of the spiral groove, as in the MO case. However, unlike MO (which utilizes polarization detection), PC data retrieval consists simply in optical amplitude detection of read beam light reflected from the disc surface. This is based on the fact that the amorphous and crystalline regions of the disc surface will display different reflectivities.

As in the case of MO, there are many published methods to promote geometric symmetry between the leading and trailing ends of the data marks formed in the recording medium, for accurate detection of mark/land transitions— i.e., for reliable data retrieval. As in the case of the MO method, these appear exclusively to deal with broadening the leading end of the mark to match its already broad trailing end, by increasing the energy input to the recording medium at the leading edge of each write laser pulse. In the PC method, this is typically accomplished by decreasing the relative spacing of the narrow pulses comprising each write laser drive pulse or by increasing their individual duration, toward the leading portion of each such collective pulse.

There are also published methods to alter the shape of certain types of marks in specific media to convert them into three-dimensional bumps. Typical of these are U.S. Pat. Nos. 4,719,615; 4,852,075; and 4,912,696. These all name Feyrer, et al as inventors, and are assigned to Optical Data Inc. Since they are quite similar, they will be referred to, herein from time to time, as the "Feyrer Patents." These patents teach a dual-threshold, dual-layered concept, in which the inner layer—i.e., the one closest to the optical recording structure substrate—is composed of a material whose shape can be changed by the injection of heat, typically from a laser beam. In the write mode, when the higher write temperature threshold is exceeded, the material expands to form raised bumps; in the erase mode, when the lower erase threshold is exceeded, the material contracts back to its initially flat configuration. The outer layer, of an entirely different composition, is bonded to the inner layer, and its purpose is to cause the heat-induced inner-layer bulge to be preserved after data writing, so that it can later be read. The heat causing the inner-layer bulge simultaneously causes the outer layer to become elastic, which elasticity ceases when the dual layer cools at that particular location.

It has been seen that MO and PC are each thermal optical data recording methods to produce a succession of erasable/ re-writable, two-dimensional marks and intervening lands along a track, or tracks, in their respective data recording surfaces. In the case of the Feyrer Patents, a dual-layer, three-dimensional PC concept is also taught. However, it can be appreciated, even from the foregoing brief discussion, that the respective methods proceed on entirely different sets of physical principles, requiring quite different "write strategies" to optimize mark formation for accurate data retrieval. This can easily be verified by comparative reference to the published literature on either method, despite the apparent fact that many of the write strategies described in these references are merely theoretical or based on computer modeling only, rather than having been rigorously tested in real-world circumstances.

Photoresist ("PR") digital optical data recording likewise generates a succession of marks and lands along a track on a surface of an optical recording disc. Unlike the MO and typical PC methods, however, PR is a method for producing three-dimensional marks—i.e., pits or raised bumps—and/ or tracking grooves in the disc surface. For convenience, the ensuing discussion will emphasize pit generation, recognizing that the only difference in the PR method for selective production of indented or raised features lies in the proper selection of the photoresist material and the respective developing chemical(s), which selection procedures are well known in the art.

However, it is important to note that because of its ability to produce pits, the PR optical data recording method, in obvious contrast to the MO and typical PC methods, can be, and commonly is, used to generate disc masters, from which great numbers of commercial daughter discs—replica compact discs (CDs) or digital versatile discs (DVDs)—are pressed. Similarly, the PR method may be utilized to generate tracking groove (or tracking ridge) disc masters, e.g., for MO and PC disc substrates and CD-R/DVD-R blanks. While the Feyrer Patent PC teachings might, at first glance, appear to be applicable to disc mastering, the complex bonding processes and the nature of the materials necessitated by the Feyrer dual layer concept would not be conducive to commercially-practical, accurate disc mastering and replication.

But by the same token, a PR disc cannot conveniently be erased and re-written, and PR is therefore inapplicable to the chief purposes of the MO and PC methods: erasable/re-writable data storage. This merely demonstrates, once again, the fundamental differences existing between the respective methods of optical data recording.

The PR recording method is essentially a photographic engraving process. The recording surface of the master disc comprises a thin (~0.10 to 0.12 micron), photosensitive polymer resin layer of substantially uniform composition, which has exposure characteristics virtually identical to those of photographic film emulsions. Accordingly, PR is a purely photochemical (i.e., optical) method of optical data recording, as opposed to the MO and PC methods, which are thermal in nature. In other words, in PR, it is not the quantity of heat instilled in a selected small portion of the disc surface that exposes the photoresist; it is merely the quantity of incident light that determines if sufficient exposure occurs to enable formation of the desired marks. A threshold quantity of light is required to effect initiation of exposure at the photoresist surface. The extent and depth to which the photoresist below the immediate surface is exposed depends on the intensity of the impinging light and the optical characteristics of the photoresist material, itself. Because of light absorption and scattering within the photoresist medium, the width of the exposure within the medium typically decreases as its depth increases. However, as a general principle it is accurate to say that increasing the incident intensity will tend to increase the depth of exposure within the photoresist medium.

Since PR is normally applied to pit/land disc mastering, further reference will be directed toward that particular application. In accordance with convention, the input data are subjected to EFM (eight-bit-to-fourteen-bit) modulation, in the case of CD mastering. Here, sequential binary input data are converted into a sequence of spaced rectangular pulses, each of whose durations is nT, where T is the EFM clock period, approximately 231 nanoseconds (billionths of a second), and n is an integer from 3 to 11. In the case of DVD mastering, "EFM Plus" modulation is employed. This differs from EFM modulation principally in that: (1) eight-to-sixteen bit modulation is employed, and (2) the integer n may be 3 to 11, or 14. Every EFM or EFM Plus coded data stream always contains pulses and intervening temporal spacing comprising all of the possible nT durations. Thus each data pulse and each "off" period intervening between successive pairs of them are of nT duration, where, in each data stream, all permitted values of n must be represented in both the pulses and the intervening periods. Other modulation schemes have been used or proposed, and further modulation methods will be employed in the future, especially as the data recording density on disc masters and replicated discs inevitably increases. However, it should not be difficult to generalize from this discussion to encompass any such ordinary engineering modifications.

The pulses ("on" times) ultimately generate pits in the disc surface, while the "off" times result in the intervening lands. Because the entire data stream is coded, both the pits and lands contain independent data. As is well known in the art, for proper data retrieval the resultant duty cycle (i.e., the ratio of pit length to pit-plus-next-land length) to should be approximately 50%. However, the duty cycle is averaged over a number of successive pit-land sequences, in a manner set by convention. Therefore, the length of each pit and of each land within such a sequence represents a separate, independent datum, despite the fact that the average duty cycle within the sequence set by convention is preferably maintained at approximately 50%.

Whether EFM (CD) or EFM Plus (DVD) coding (or any other modulation scheme, such as "Two-to-Seven") is applied, the purpose is to insure that the data pits in the resultant disc are mutually spaced in a programmed manner to facilitate tracking. In commercial CD and DVD players tracking would otherwise prove difficult if, for example, a particular sequence consisted of a binary "one" followed by a lengthy sequence of binary "zeros." With appropriate modulation, the CD or DVD player logic can anticipate the next pit (or land) in one of a specific number of succeeding locations. Although this may work reasonably well, it will be shown below that tracking can still be difficult, and this fact forms one basis for the present invention.

In PR recording, an EFM (or EFM Plus) coded waveform results in modulation of the intensity of a focused spot of light (normally from a diode or gas laser) impinging on the recording surface of the revolving disc. By properly synchronizing the rotational speed of the disc with the radial position of the beam relative to the disc center, this produces a track of narrow (width generally less than ~1.0 micron), elongated latent images produced when the light spot is "on," interspersed with unexposed lands. When the entire spiral track (or collection of concentric tracks) is "exposed" onto its surface, the master disc is "developed," as in the case of ordinary photographic film. Immediately upon completion of that step, an etching solution is introduced to dissolve and remove the exposed regions of resist (or the unexposed regions, depending upon whether a positive or negative resist is used), which creates a succession of narrow, three-dimensional, elongated microscopic pits and intervening lands. The length of each pit and the length of each land represents an independent datum corresponding to a particular data packet in the original EFM (or EFM Plus) signal. As in the case of MO and PC recording, these elongated pits are microscopic, and there are normally many millions of them in the spiral disc track (or in each of the concentric tracks if there is more than one). Thus, when viewed microscopically, the pits will appear as a linear sequence of narrow, elongated, straight depressions, with intervening lands, lying alongside another such sequence radially (i.e., transversely) displaced from it by the fixed track pitch.

In CD and DVD applications, the pit and land lengths will each correspond spatially (i.e., in length) to the temporal duration of the corresponding portion of the coded data, so that when the disc—or a daughter disc replicated from it, in the case of a disc master—is played, the resulting information output will match the original information. To insure that all pits corresponding to nT in the original data are the same length for each particular value of n, the rotational speed of the disc master must be continuously varied during the recording process, and the rotational speed of the final disc must be correspondingly varied during playback, as is the case in all CD and DVD recording apparatus and players. In other words, the rotational speed must be varied, so that the linear speed is constant at every location. Accordingly, the rotational speed will vary in inverse relationship to the radial distance from the disc axis.

This is in contrast to a major MO application—computer hard drives—where CAV (constant angular velocity) is maintained. There, CAV insures rapid data acquisition and retrieval, because no time is expended in changing rotational speed when the particular radial position of the desired data is reached. Of course, CAV can be applied to other optical data recording methods. However, where data retrieval at extremely rapid hard drive acquisition rates is not essential—for example, in most CD-ROM and DVD-ROM applications—the introduction of necessary decoding logic to account for different data mark lengths corresponding to identical data values, depending on radial distance, may not be justified.

Returning to the PR method, the thickness of the photosensitive data layer (deposited on the much thicker glass or polycarbonate substrate) is selected to be identical to the desired pit depth. Thus, when the photoresist is fully exposed (through its entire thickness), flat-bottomed pits will be produced, whose depth will be the same as the thickness of that layer, and whose sidewall-to-base junctions, at least, are angular. Failure to fully expose the photoresist (resulting in residual photoresist at the bottom of the pit) has been found generally to produce "noisy" data output readings, because of inherent roughness in the etched photoresist layer and greater susceptibility to recording laser noise. These compromise detection accuracy, because pit and land playback signal amplitude is affected by surface characteristics.

Accordingly, the thickness of the photoresist layer and the exposure level—and thus the resulting pit depth—are normally selected for optimal detection in a manner well known by those skilled in the relevant art. Pit width is determined by the power and effective width of the recording beam. The latter is determined by the wavelength of the write laser utilized and the numerical aperture ("NA") of the focusing means, in a manner likewise well known in the art. The transverse (i.e., radial) sectional shape of the pit, whether rectangular or trapezoidal, may be controllable by the optical characteristics of the photoresist material and by the particular focusing configuration selected, as described in the Dil and Sugaya, et al patents referred to below. Finally, the length of each resulting pit will be primarily determined by the duration of the corresponding EFM (or EFM Plus) data pulse, as will be the length of each intervening land.

Once recorded, a PR-generated disc master is converted to a metal stamper by conventional galvanic processes, and daughter discs are pressed from it. If sufficient skill and care are exercised, the stamper will be a virtually exact mirror image of the master, and the replicated discs will likewise be virtually exact copies of the master. Less stringent controls can yield a stamper that is a reasonably good mirror image of the master, but replicated discs whose reproduced pits do not exactly reproduce the cross-sectional shape of those in the master. The latter is typically the result of imprecise molding methods, yielding replicated disc pits whose cross-sectional shapes in the radial direction display rounded corners, rather than the normally crisply angular corners of the master disc pits.

Double-sided discs can be generated by utilizing two molds—one for each side. Furthermore, double-layered discs may be made by layering two data bearing surfaces on each side of the resulting CD or DVD, each layer again created by a separate stamper produced from its disc master. Retrieving the data from each layer depends on conventional means to detect reflection of light partially passing through the interface between the layers. Theoretically, multi-layered, two-sided CDs and DVDs (and anticipated future expansions beyond present DVD-ROM data densities) could thus be produced, all based on the same PR disc-mastering procedures.

The process for generating tracking groove disc masters (e.g., for MO and PC disc substrates and CD-R/DVD-R blanks) by the PR method is quite similar to that employed for pit production. Indeed, the groove mastering process is simplified by the fact that the desired spiral groove is normally continuous over all or most of the disc master. Thus, a tracking groove master can be generated merely be providing a constant amplitude input to the writing light source and synchronizing the radial position of the write beam with rotational speed of the disc and timing, by conventional methods. If a discontinuous tracking groove master is desired, this merely requires selective write beam extinguishments and radial position adjustment, likewise by conventional methods. By ordinary engineering modifications within the basic principles, virtually any sort of tracking groove master may be generated by the PR method. Likewise, by a conventional selection of photoresist material(s) and development chemical(s), a tracking ridge master may likewise be produced for any application requiring it.

One common tracking groove configuration is dictated by the specifications for unrecorded CD-Rs and DVD-Rs, which require "wobbled" grooves. In these applications, the tracking grooves in the unrecorded discs are not merely spiral. Rather, a radially sinusoidal displacement is superimposed onto the spiral tracking groove as it is created. In CD-R grooves, the specified amplitude of the sinusoidal "wobble," in respect to the longitudinal axis of the "un-wobbled" spiral groove, is ±30 nanometers (nominal), and its frequency is approximately 22 kHz, at nominal linear velocity of recording. A separate input to the write beam radial positioning means creates this selective wobble.

Regardless of the particular application, the PR method is essentially an etching process, and a certain amount of roughness occurs on the pit sidewall surfaces is thus inevitable. While this has not proved to be a particularly significant problem in CD mastering applications, where data retrieval is essentially diffraction-interference based, the PR method of disc mastering appears not entirely conducive to production of DVD masters from which commercial DVD-ROM's can be rapidly manufactured with a low rejection rate. This is because DVD data retrieval is a necessarily more sophisticated process, relying on phase comparisons, as well as the basic diffraction-interference effects. The inherent roughness of PR-generated data pits impedes accurate DVD data retrieval.

Furthermore, this problem of roughness in PR-generated disc masters can only become more troublesome as data densities increase beyond the present DVD-ROM level of approximately 4.2 gigabytes per data layer, and data retrieval strategies necessarily become more sophisticated. Few would argue that a much higher data density than can presently be provided even by two-sided, double-layered DVDs would not be highly desirable, and this will undoubtedly occur as practical ultra-violet and perhaps higher-frequency lasers and other beam sources are developed, and narrower (and correspondingly shorter) pits and track pitches result. When this occurs, the inherent roughness of PR-generated disc masters may further limit their utility.

The characteristic roughness, and the fact that PR-generated pits are normally rather steep-sided and display angular corners, also result in certain difficulties in separation of daughter discs from the stampers by which they are reproduced. Pits that are trapezoidal in cross-section—as described, for example, in U.S. Pat. No. 4,209,804 (Dil), U.S. Pat. No. 4,230,915 and U.S. Pat. No. 5,459,712 (Sugaya, et al), in contexts unrelated to separation of daughter discs from stampers—might alleviate that problem, if pits of the shapes described therein can actually be generated by the PR method. This is theoretically possible, as briefly discussed above, although it is by no means certain that the various parameters can be selected and controlled, in practice, to achieve the desired results. However, even if such pit configurations are possible with the PR method, this inherent pit roughness and angularity problems can, at best, only be somewhat alleviated, even by the methods described below in the context of the present invention. In all probability, it may not be possible to completely eliminate them.

By contrast with the MO and PC methods of optical data recording, heat is not directly involved in PR pit production; it is merely the time-integrated light power density acquired from the focused recording light spot that exposes the master disc. The thin photoresist layer absorbs very little heat, since its thermal absorption is quite low and only a small fraction of the incident light photons—on the order of 1 in a million—are captured by the photosensitive component of the surface material. The PR recording method is, therefore, an adiabatic process. Thus, PR recording write strategies are typically much simpler than those that would be optimal for the other—thermal—optical data recording methods. Indeed, in PR CD applications a binary pulse-length modulated waveform (such as the "raw" EFM or EFM Plus waveform) that has only minor adjustment to the lengths of its "on" pulses may often be directly applied to modulate the laser beam to effect reasonably high quality, full-depth pit recording in a thin photoresist layer.

Dye-polymer optical data recording is addressed in U.S. Pat. No. 5,297,129 (hereinafter, "the '129 patent"), assigned to the assignee of the present application. Like PR, it is presently employed to reproduce EFM and EFM Plus coded digital or digitized data streams as tracks of three-dimensional, elongated microscopic pits and intervening lands in optical data storage structures, and is likewise utilized to produce disc masters from which commercial CD-ROMs and DVD-ROMs are stamped. It is also utilized to produce tracking groove masters for MO, PC, CD-R and DVD-R production, and to produce masters for "hybrid CDs" (incorporating an annular CD-ROM portion containing recorded data, plus an annular CD-R portion containing a tracking groove in an optically recordable medium on which further data can later be recorded).

However, unlike PR, dye-polymer recording is a thermal process, and thus it proceeds on the basis of physical principles quite different than those underlying PR. Likewise, it can easily be seen that dye-polymer recording, although a thermal process, differs from MO and PC, in that the physics of these three processes are fundamentally different.

Essentially, the dye-polymer process, applied to disc structures as the principal example, comprises selective expulsion of the photo-thermally active recording layer of a disc (or disc master, as may be the case). This surface is comprised of a mixture of a polymer (nitrocellulose having been commonly employed) and a dye whose color is complementary to that of the write beam (normally from a laser source) to promote maximum heat absorption. If, for example, the write beam consists of a red or infrared diode laser, the corresponding dye color would likely be a suitable shade of blue or blue-green. On the other hand, if an argon ion laser write beam (or other blue light source) were utilized, a red dye would probably be chosen.

Theoretically, if a sufficiently powerful energy-transferring beam were employed, the dye content could be reduced or perhaps entirely eliminated. But the result would otherwise be identical to the normal dye-polymer process, and these "low-dye" and "dye-less" methods would thus merely be species of the general dye-polymer method and included within it for the purposes of the present invention. But unlike the complex, dual-composition data layer taught in the Feyrer Patents, for example, the mixture comprising the data layer in any such dye-polymer process would be substantially uniform in composition throughout that layer.

For clarity in presentation, primary reference will once again be made to disc embodiments and applications. However, it will be understood that the principles underlying dye-polymer optical data recording apply equally to other recording-structures, such as cylinders, cards and data wafers, as does the present invention.

In the case of discs, the (photo-thermally) active layer is spin coated onto a surface of a supporting disc substrate, normally constructed of glass or polycarbonate plastic, or from another material of suitable strength and optical and thermal properties. In the case of "first surface recording," where the write laser is directed externally "from the top" onto the active layer (e.g., in some mastering applications), the substrate need only possess suitable strength and thermal expansion properties, compatibility with the material comprising the active layer and compatibility with the substances utilized in the subsequent galvanic processes. However, in the more typical "second surface recording" case (e.g., CD-R, DVD-R and some disc mastering applications), where the write laser beam is directed "from the bottom," through the substrate and focused onto the active layer lying at or near the opposite surface of the substrate, the substrate material must also possess a suitable level of transparency and index of refraction, in respect to the particular write beam wavelength. To decrease reflectivity from the "bottom" surface of the substrate, an appropriate anti-reflective coating may be applied there. Whether first or second surface recording is performed, the detailed selection and implementation processes are well within the capacity of an optical engineer with ordinary skill in the art, based on the discussion herein and in the '129 patent, and on the nature of the physical processes involved.

During pit formation (and also during data retrieval) the disc spins rapidly. The speed of rotation varies continuously, in inverse ratio to the distance of the write beam from the center of the disc, to insure that the linear speed of pit formation (i.e., the speed of the relative longitudinal movement between the write beam and the track) remains constant. As in the case of PR recording, this is to insure that each pit spatially representing a data packet of a given temporal duration, nT, is of the same length as all other pits representing that same nT duration, to insure that upon playback (where angular speed is correspondingly varied to insure constant linear speed) all pits of the same length will yield the same output value. CAV recording and playback could be utilized. However, this is not generally done, for the reasons briefly explained above.

Expulsion of material, in the context of dye-polymer optical data recording, is believed to comprise some combination of decomposition (breaking of polymer chemical bonds to form smaller molecules); explosion (forceful discharge of material by chemical reaction); fluid flow (plasticization or melting), where heat-induced expansion causes flow upward and out of the formed pit); and partial compression of material from altered surface tension.

These effects, and the combination present in any expulsion context, will probably vary to some extent depending on the specific dye-polymer recording configuration. For example, in first surface disc mastering applications, an open pit is created when material is expelled and/or flows upward. In second surface disc mastering operations, where the reflective layer is normally above the active layer (i.e., on the extreme opposite side from the initial point of impact of the write beam onto the substrate), some re-condensation of material held by the reflective layer may occur as some of the latter collapses into the formed pit. Finally, in CD-R/DVD-R (second surface) applications, the "pit" is actually a bubble-like void formed by gasification, deformation and refractive index change between the reflective layer and the substrate, as the active layer material within it is expelled. That void displays distinct optical characteristics that can be read "from the bottom" in the same manner as the pits (viewed, from the bottom, as bumps) of a CD-ROM are read, which is why CD-Rs and DVD-Rs can be read in ordinary CD and DVD playback devices.

In any event, expulsion begins to occur when the material in a tiny region of the active layer exceeds the thermal threshold of the moving medium. Somewhat as in the case of PC recording, this thermal threshold is not readily measurable, nor is it directly proportional to the instantaneous intensity of the write beam causing it. Rather, it is a temperature level induced in a minute volume of material by a quantity of heat absorption in that tiny portion of the medium, as it moves relative to the energy-transferring beam creating it. Thus, it depends on many factors, including (but not limited to) the temporal and spatial write beam intensity profile, the thickness of the active layer, the instantaneous speed of rotation of the disc, the exact nature of the materials comprising the dye-polymer material and their proportions, the nature of the disc substrate and ambient conditions. All of these can vary from batch to batch and day to day. An analogy might be made to a pot of water on a stove. Here, boiling results as the energy induced into individual water molecules causes them to undergo a change of physical state from liquid to gaseous, at a temperature threshold that is reached at that molecular level. The amount of heat applied is only one factor in determining when and how rapidly the water will boil. Other factors include the quantity and purity of the water, the nature and thickness of the water container and ambient conditions.

Accordingly, write strategies applicable to the dye-polymer method of optical data recording must be based on the physical principles and peculiarities of the dye-polymer recording process (as opposed to the very different MO and PC processes, for example), and must provide the flexibility to facilitate optimization for each set of blank discs and recording conditions.

To provide the context for a discussion of particular write strategies, and particularly to those that form the basis of the present invention, the dye-polymer method will first be explored, with emphasis on first surface disc mastering applications, merely for clarity.

A laser output typically generates the tightly focused write beam, although neither this discussion nor the present invention is limited to the use of a laser write beam. Ion beams, electron beams and many other intense optical or pseudo-optical energy-transferring beams may be used. In the case of a solid-state (e.g., a diode) laser, a digital data stream (normally, a series of spaced rectangular pulses, resulting from EFM or EFM Plus coding of binary data) can form the drive input to the laser, thus directly controlling its output. This is because a solid-state laser will respond essentially instantaneously to that input. However, if a gas laser is employed, external modulation must normally be employed, since gas lasers typically cannot react to input fluctuations as rapidly as can solid state lasers. Accordingly, in the case of a gas laser, control of the laser output is typically accomplished by some means interposed in the path of the emitted beam, such as an acousto-optic modulator ("AOM"), which is controlled by the digital data stream input, or by a selective derivative of that input. But there is no essential difference between these two methods (or, indeed, between either of them and a method utilizing some other intense energy-transferring beam), because in either case it is the amplitude waveform of the modulated digital data stream that ultimately determines the intensity profile of the beam that impinges on the active disc layer. The choice is dictated by the particular laser (or other beam) type chosen, in a manner well within the ability of an ordinary practitioner, in light of the teachings herein.

The impinging write beam has typically displayed an essentially circular cross-section with an approximately Gaussian (bell-like) intensity distribution measured diametrically across the circle. In other words, the cross-section is essentially an Airy Disc. The diameter of a concentric circle that will enclose 50% of the total light power in this Airy Disc spot is less than 1 micron in the usual case of a laser write beam of typical frequency. When the focused spot is turned "on," a significant fraction of its light power is absorbed in the thin dye-polymer layer, causing heat to be generated in the tiny area illuminated. Almost immediately after it is deposited, this heat will begin to diffuse away from the minute area where it was originally injected. If enough heat is coupled into a small volume (typically less than 1 cubic micron) of dye-polymer material for a sufficiently long period of time (~a few tens of nanoseconds or less), the thermal threshold of the moving material in that small volume will be exceeded and expulsion will occur.

Particularly in the case of CD/DVD mastering applications a portion of the material that melts or plasticizes and is caused to flow out of the formed pit will re-solidify at the cooler top of the pit. This will create an elevated lip or "berm" surrounding the pit that is formed when the material originally occupying that space was expelled. Because the disc is spinning during this process, the resulting bermed pit will be elongated, and will continue to elongate as long as the thermal threshold at the trailing end of the forming pit is exceeded.

At CD or DVD recording speeds pit writing in the thin dye-polymer layer is not a truly adiabatic process—i.e., a portion of the heat created in the thin optically active layer may migrate (diffuse) some distance from the point at which it was originally generated, in part as a result of the complex expulsion process. This "thermal smearing" affects the size and shape of the recorded pit. Accordingly, in dye-polymer CD/DVD recording, the applied write strategy must precisely manage the generation and resulting flow of heat within the thin active layer to insure that the resulting stream of recorded pits and lands may be accurately tracked and read. Clearly, an optimal write strategy will depend on the physical, rheological and optical parameters of the active layer and substrate, the shape and power range of the focused recording spot, the range of velocities at which the disc is rotated, the range of nT pulse and spacing durations in the recorded data stream (i.e., whether in the context of CD or DVD recording or some advanced, higher-density write strategy) and the desired characteristics and tolerances of the playback signal that will be obtained when the final stream of pits is ultimately tracked and read.

Clearly, as in the case of PR mastering, for accurate data retrieval (i.e., accurate determination of all individual pit and intervening land lengths) by a CD or DVD player, the write strategy should optimize detection of the pit/land transitions. One way of improving the accuracy of pit/land detection is to cause the pits in each track of the master disc to display three-dimensional geometric symmetry (i.e., to cause the shape of the two ends of each pit to mirror one another). Another way to improve detection of pit/land transitions, particularly in discs replicated from PR or dye-polymer masters, is to employ appropriate pre-compensation to adjust the duty cycle and/or depth of the three-dimensional marks recorded on the disc master, based upon their respective radial positions on the disc. The latter are discussed, respectively, in U.S. Pat. Nos. 5,608,711 and 5,608,712 (hereinafter, "the '711" and "the '712" patents), assigned to the present assignee. These methods, which will be discussed below in various contexts, can be applied individually or together.

Accurate data retrieval also requires accurate tracking. So the write strategy must additionally provide sufficiently precise pit shapes and land configurations to insure that even relatively inexpensive CD and DVD playback devices can accurately follow the data track(s), while they perform accurate data retrieval (detection of pit/land transitions and, thus, individual pit and land lengths and corresponding data values).

Unfortunately, this is complicated by the fact that the criteria inherent in accurate data retrieval (high frequency, "HF") detection and in accurate push-pull ("PP") tracking, required in all pre-recorded CD applications, are mutually exclusive. Similarly, there exists a fundamental tradeoff in PP and groove reflectivity, in unrecorded CD-R and DVD-R specifications. Hybrid CD specifications require analogous compromise. Indeed, it is safe to say that in nearly all optical data recording methods, some compromise must be made between two or more detection requirements.

When writing a pit by the dye-polymer method, the write beam is focused to cause its diameter (i.e., the diametric distance from a ½ power point to the opposite ½ power point in the Gaussian distribution of power within its cross-sectional Airy Disc) to be approximately the width of the pit to be created (conventionally measured halfway between the disc surface and the base of the pit). The read beam diameter is generally double the width of the pit.

According to specification, the CD track pitch ("TP") is between 1.5 and 1.7 microns, the nominal value being 1.6 microns. The length of an EFM-coded CD pit is nominally 0.3 micron per T, where the pit spatially represents an input data pulse of nT temporal duration. The width of a CD pit (again, measured at half depth) and the diameter of the write beam creating it are each approximately 0.5 micron, i.e., approximately TP/3. On the other hand, the read beam is approximately double that width, or about 1 micron wide. Since various laser wavelengths are utilized in CD recording, the numerical aperture of the objective lens focusing the beam must be selected to yield a beam spot of the same diameter regardless of the beam source, so that the pits will be the same width regardless of the apparatus used, to insure that the resulting pits may be uniformly read. The spot diameter, d, is determined by the formula $d \approx 0.5\lambda/NA$, where $\lambda$ is the beam wavelength in vacuo, NA is the numerical aperture and d is the diameter of the resulting spot. In the case of CD playback, for example, $\lambda = 0.780$ micron, and NA=0.45, so $d \approx 0.9$ micron.

Similar proportions apply in DVD applications, although the dimensions pertaining to DVD recording and reading are approximately 50% of those pertaining to CD applications, reflecting the correspondingly shorter channel bit lengths of DVD marks. Presumably, future higher-density applications—utilizing higher frequency (i.e., shorter effective wavelength) write and read beams, smaller pits and narrower track pitches—will employ similar relative proportions.

Most dye-polymer disc mastering systems utilize DRAW means, whereby the readability of the formed pits can be determined in real time as they are created. These generally utilize a monitoring beam, whose light reflected from the disc is detected and analyzed, as described, for example, in U.S. Pat. Nos. 4,809,022 and 4,963,901. Since DRAW mastering is now reasonably familiar to those skilled in the relevant art, it is believed unnecessary to further discuss it here.

The same read beam can be used for HF and PP detection, although it is suitably divided, as described herein and as well known in the art. However, although both are based on measurement of light reflected from the disc, HF and PP detection proceed in accordance with opposing principles.

In HF detection, it is the reflectivity contrast between pit and land portions of the data track that is observed. The goal in this regard is to cause pit areas to be seen as very dark and land areas to be seen as very bright. This is so that when the beam passes through a pit/land transition (as the disc revolves rapidly and the track of pits and lands moves at correspondingly rapid linear speed relative to the read beam), the established level of detected brightness constituting a transition event will be reached and passed clearly and quickly. If the pit/land transition events can be detected with great accuracy, this will result in precise determination of the corresponding pit and land lengths, from which the original information can be reliably re-generated.

The desired HF optimization is achieved with an effective pit depth (noting that each pit will normally posses a curved base, caused by the dye-polymer expulsion processes) equal to $\lambda/4$, where $\lambda$ here is the wavelength of the (typically, laser) read beam within the substrate material (since discs are normally read from the second surface). This will create a $\pi$ (180°) phase shift in the reflected light, effectively canceling out, by interference, the small proportion of incident light not already scattered away by diffraction. By contrast nearly 100% of incident light is reflected from the essentially flat land areas. It can easily be seen, then, that with $\lambda/4$ pit depth the change in reflected light detected at each pit/land transition will be very abrupt, thus facilitating accurate detection of pit and land length—i.e., accurate HF detection.

By contrast, PP detection generally measures the quantity of light diffracted from the pit at an angle in respect to the perpendicular direction. This is normalized with the known or observed reflectivity of the disc surface, to provide comparative values in the particular context. Thus, in CD applications, radial PP detection is merely an amplitude comparison of detected light on either side of the longitudinal track axis (whether within a pit or a land area). When more reflected light is received on one side of the PP detector than the other, the PP servo moves the read beam in the opposite direction, radially, until detection in the two halves is equalized, indicating proper tracking. An effective $\lambda/8$ groove depth, producing a $\pi/2$ phase shift, optimizes PP detection, rather than the $\lambda/4$ groove depth and corresponding $\pi$ phase shift that optimize HF detection. As mentioned above, a similar dichotomy in criteria exists between PP and unrecorded groove reflectivity determination in CD-R and DVD-R applications, and other optical recording applications, such as hybrid CDs, present analogous dichotomies.

To promote reflection, and to increase playback amplitude (without correspondingly increasing reflectivity contrast), the entire disc is usually provided with a thin coating of aluminum (or other suitable highly reflective, easily applied material). Both detection procedures are based on the fact that, in the context of the dimensions inherent in the process, the pit acts as a single-slit diffraction grating, scattering most of the incident light in a direction radial to the disc and returning only a small portion back in the direction of the incident beam for detection. But the two processes are inherently opposed.

Because of these well-recognized problems, the concept of "Figure of Merit" has become widely applied in connection with development of write strategies for all optical data recording, including tracking groove mastering (although principal reference will here be made to PR and dye-polymer data disc mastering). Simply stated, the Figure of Merit is a weighted function that measures overall conformity to the established standards. In the case of pre-recorded CDs and CD masters, its contributing factors are the amplitude of HF detection, the amplitude of PP detection, minimization of cross talk between radially adjacent portions of the recorded data track and other factors not as relevant to this discussion. In short, the ultimate purpose of write strategy development in optical data recording—particularly disc mastering of any nature by the PR and dye-polymer methods—is to maximize the Figure of Merit.

The invention described and claimed in the '129 patent constitutes a major step toward this goal. By its specific reference to a thermal optical data recording method, it excludes the PR method (which is a purely optical, not a thermal data recording method), as well as MO and PC (which do not produce marks of the types identified in the '129 patent). Thus the principal context of the '129 patent is the dye-polymer method. Because it is a thermal process, involving plasticization (softening or melting) and fluid flow to a certain extent, the dye-polymer method, by its very nature, tends to produce pits with smoother surfaces than those generated by the PR method. As discussed above, this facilitates data retrieval (particularly in DVD and other ultra-high data density applications), as well as separation of injection-molded replicas from their stampers.

Focusing, then, on the dye-polymer method, particularly in reference to disc mastering, the '129 patent provides a superior method and apparatus for generating pits for improved HF detection. The published prior art write strategies (relating, perhaps exclusively, to the MO and PC methods) apparently hope to deal with geometric asymmetry in data marks by increasing the write beam power at the leading edge of write pulses to blunt the leading end of data marks (which are otherwise tapered because of time delay in heat buildup in the moving medium at the leading ends of the marks), to match the blunt trailing ends caused by abrupt shutoff of write power pulses at their trailing edges. By contrast, the essence of the '129 patent invention is to modify the trailing edge of the write pulses to taper the trailing ends of the pits to match their already tapered leading ends.

In the context of the '129 patent, the term "taper" refers generally to the elongated pit leading end broadening caused by initial heat buildup as pit formation begins, or to the elongated trailing end narrowing brought about by the moderated pulse trailing edge decline in write power taught in the '129 patent. That is to say, the term is not limited to leading and trailing end shapes that are pointed, and may include elliptical or other elongated (as opposed to bluntly semi-circular) shapes, the important consideration being that whatever the shape of the leading end elongation, it is an important purpose of the '129 patent to provide a trailing end elongation to mirror it. It is in that broader sense that the term "taper" is used in the context of the present discussion and invention, as well.

Fundamentally, the '129 patent describes and claims the concept of a trailing region of the write pulse within which the write beam power is decreased over time, rather than abruptly shut off. While the preferred embodiment describes a ramped trailing edge, it can be seen by those with ordinary skill in the relevant art, having a basic understanding of the physical principles involved, that the trailing edge modification claimed in the '129 patent may, for example, alternatively comprise an exponential decay, a series of steps or even a single intermediate step, all equivalently within the claimed concept. As described in the patent, this is because the trailing end taper is generated by the moderated decrease in write power, causing a slower drop through the thermal threshold of the moving medium than in the case of an abrupt power shutoff.

As described in the '129 patent, this not only improves HF detection, but it also facilitates optimization of the write strategy to account for fine differences in blank disc batches, ambient conditions and other factors. This is because the trailing region parameters—whatever its chosen power decline profile—can more easily be adjusted for optimal mark configuration than in the case of an abrupt terminal power shutoff, where the only easily adjustable parameters might be write pulse length, write level and the shape and/or extent of a leading edge power boost (if any).

The '711 and '712 patents provide additional improvements in HF detection. Specifically, the '711 patent teaches methods and apparatus for adjustment of the data track duty cycle in certain areas of the disc master to compensate for effects of the replication process. Similarly, the '712 patent provides a method and apparatus for selectively adjusting pit depth in disc masters to improve HF detection in replicated discs. These strategies may be applied individually, together and/or with the teachings of the '129 patent, according to need.

Yet despite these significant steps toward Figure of Merit maximization, the '129, '711 and '712 patents do not emphasize another of its major components—tracking accuracy.

A recent European patent—EP 9110611.7 (hereinafter, "Schoofs")—deals, to some extent, with the problem of increasing the Figure of Merit by improving PP detection in an optical data disc (apparently, a dye-polymer recording), without unduly compromising HF detection. The proposed solution is to increase the intensity of the write beam between write pulses to a level just above the thermal threshold of the moving medium. This creates a narrow, shallow groove in the land area intervening between successive pits, which essentially increases PP tracking signal strength between pits with hopefully little negative effect on HF (i.e., pit/land transition) detection accuracy.

To a certain degree, the method taught there does satisfy the PP optimization criteria, in that the land groove can be made to be approximately $\lambda/8$ in depth. However, because this is accomplished by reducing the write beam intensity to near the thermal threshold, the resulting land groove must necessarily be quite narrow. But this actually compromises PP detection, because optimal PP detection is realized with a groove that is wider than one that would optimize HF detection. Furthermore, HF detection is not significantly addressed by Schoofs. Indeed, the logical extension of the Schoofs teachings would be to further increase beam intensity between pits to widen the groove for better tracking. But that would compromise PP detection by deepening the groove and would also compromise HF detection by causing pit/land transitions to be more difficult to detect, thus negatively counterbalancing the proposed PP improvements in the overall Figure of Merit.

The above-mentioned Dil patents (U.S. Pat. Nos. 4,209,804 and 4,230,915) address tracking of the pits themselves, to some extent. Both of these patents discuss PP detection and the problems associated with it. The first of them seeks to alleviate such tracking problems by sloping the sides of the pits to cause the pits to appear to be shallower than they actually are, for the purposes of PP detection, while allowing the HF detector to see an effectively greater depth. The second modifies the first by proposing that the index of refraction of the medium in which the pits are ultimately created be chosen, together with the side angles of the pits, to optimize that result. The goal of these teachings is, of course, to attempt to optimize the Figure of Merit.

But there are several fundamental problems with either of those teachings—which are both based on the PR optical data recording method: (1) it is difficult to consistently produce slope-sided pits by the PR method, which is essentially an etching process and which, therefore, tends to generate pits whose sides are perpendicular to the disc surface; (2) slope-sided, PR-generated pits will expose more of their characteristic roughness (i.e., noisiness) to the HF detector, which makes DVD and ultra-high density data retrieval difficult; yet (3) pits whose sides are perpendicular to the disc surface increase the previously discussed problem of difficult stamper-replica separation.

Neither of these latter two patents nor the above Schoofs patent addresses the problem created by the fact that the optimal groove/pit width for PP detection is not the same as for optimal HF detection.

U.S. Pat. No. 5,459,712 (Sugaya, et al) also discusses certain problems related to pit shape optimization in a general, theoretical sense, in the context of increasing CD data density. However, this patent, like the other references, merely proposes a different compromise between the conflicting requirements for optimal PP and HF detection.

Therefore there is a need for a method, an apparatus and resulting pit and land geometry by which the Figure of Merit in optical data recording discs, disc masters and other optical recording structures displaying three-dimensional marks can be reliably improved by optimizing tracking detection along the entire track of data marks without substantially compromising HF detection and other specifications.

Furthermore, there remains a need, in optical recording structures, for data features of improved cross-section, so that when a data track is read, cross talk between the data features on that track and the adjacent track(s) is reduced, thus likewise improving Figure of Merit.

There also remains a need for a method, apparatus and resulting groove geometry by which tracking can be improved in CD-R, DVD-R, MO, PC and other pre-groove optical data recording structures.

Additionally, there remains a need for improved data feature configurations in optical recording structure mastering applications, so that replicated discs may be separated from a stamper with reduced replication error resulting from material clinging to unwanted crevices in the stamper surface, and to consequently improve repeatability in the replication process.

BRIEF SUMMARY OF THE INVENTION

The goal of this invention is to improve Figure of Merit in optical recording structures, principally by providing three-dimensional features with improved transverse cross-section. These features may include data marks, such as pits and bumps; three-dimensional land areas; and tracking grooves and ridges. As can readily be seen from the foregoing examples, these features can be indented into the data layer (e.g., data pits) or raised above it (e.g., tracking ridges). As applied to creation of data features, the invention also improves tangential (i.e., along the data track) cross-section, to provide clearer pit-land transitions, as compared to Schoofs and other prior art teachings.

In the principal embodiments, these improved features are characterized, in part, by the fact that their transverse cross-sectional shape may display a continuous slope from one transverse end to the other transverse end. In the context of the present invention, "continuous slope" means a curvilinear shape of perhaps various curvatures, but substantially lacking angular junctions between any adjacent portions. For example, a sinusoidal waveform, or a complex waveform representing several sinusoidal waveforms summed together, will display a continuous slope by this definition. By contrast, a pit or groove with a trapezoidal section would not display a continuous slope, as the junctions between the base and sidewall would be angular, rather than curved. On the other hand, a section displaying even somewhat rounded corners would display a continuous slope.

Another element of the inventive concept, in the principal embodiments, comprises berm reduction or elimination. In this regard, berm reduction is shown by reduction in the ratio of maximum vertical displacement of the berm, from a defined index level, to maximum vertical displacement of the principal feature, from that index level. The index level may or may not be at the surface level of the disc, because the disc may contain multiple, vertically-spaced data layers, and/or the feature may be defined in respect to a trough or mound whose level is different than the surface level of the disc or of the particular data layer level.

If, for example, the feature were a pit (or tracking groove) in the structure, then the ratio would be the maximum height of the berm, measured upward, divided by the maximum depth of the pit or groove, measured downward: a first, relatively small value according to the invention. In both cases, the measurement would be made from the index level, which is the level from which the berm begins its ascent, on either side.

In the case of a data bump or tracking ridge (found typically in a structure pressed or otherwise mirrored from the foregoing structure, or perhaps created by essentially inverting the waveform controlling the write beam, as will be discussed below), the ratio would be the height of the feature divided by the depth of the berm-analogous indentation: a second, relatively large value according to the invention. That second value approximates the reciprocal of the first value.

Between those first and second values is a range of excluded ratios that might be realized without utilizing the improvements disclosed herein. These, of course, reside in the prior art.

In certain embodiments, the feature is multiple. That is to say, for example, that an improved pit might reside within a trough imposed in the data layer. Likewise, a data bump might be raised above a mound, likewise rising in the data layer. In either of those cases, the defined index level, in respect to which the transverse cross-section of the feature is analyzed, would be the level of that secondary feature from which the principal feature begins its vertical departure. For example, in the case of a pit within a trough, where berms rise from either side of the pit, the index level would be that level from which either berm begins its rise from the trough, wherever that occurs (see, e.g., FIG. 7).

A further element of the inventive concept, in the preferred embodiments, comprises the narrowing of berms, whether or not their height is reduced. Such berm narrowing reduces cross talk between radially adjacent track portions, particularly in high-density (i.e., small track pitch) applications, and also reduces the effect that the writing of surface features (e.g., pits or a groove) in one portion of the track might otherwise have on the radially adjacent portions.

Various apparatus are disclosed, by which the claimed structure displaying features of improved transverse cross-section may be produced.

In the preferred embodiments, this is accomplished by providing a secondary write beam, directed more widely and with less intensity than the primary write beam, but whose focal point is normally co-axial therewith, to create a shallow trough along selective portions of the data track, within which the individual data pits will reside. By selectively adjusting the intensity and focus of these primary and secondary beams, the secondary beam may be caused to reduce the pit berm height (or eliminate berms entirely) by expelling some material surrounding the pits. Furthermore, the secondary beam may be made to cause the pits, of optimal sectional dimensions for HF detection, to be formed within a selectively continuous trough of optimal sectional dimensions for PP detection. The secondary beam may be continued into the land areas or, if desired, maintained in an "on" state, to create an optimally-configured tracking trough along all or any selective portion of the data track. By selectively adjusting the depth of the resulting trough, HF detection will not be compromised by the improvements provided for improved PP detection, because the pit/land transitions relative to the base of the formed trough will be as easily detected as if no trough were implemented.

In further embodiments, the essential dual-beam concept of this invention may be applied to provide similar improvements in other optical recording structures. For example, the secondary beam may be utilized to provide a relatively wide, shallow trough in PR applications, by generating a secondary, lesser exposure of the photoresist material, of desired configuration, to improve tracking without compromising HF detection. Likewise, by independently controlling the configurations of the respective exposures by the primary and secondary beams, the invention provides a mechanism to improve Figure of Merit in PR applications, as it does in dye-polymer applications, by optimizing ultimate three-dimensional pit and land geometry for improved tracking with HF detection that may be improved as well.

If applied to mastering of pre-grooved discs, such as MO, PC and CD-R/DVD-R, the dual-beam concept of the invention can likewise improve tracking without compromising groove reflectivity, by providing a mechanism whereby the geometry of the grooves, in radial section, can more precisely be controlled and optimized. In particular, the berms that typically line the tracking grooves in these recording structures, if created by the dye-polymer process, can be substantially reduced in height, improving both tracking and data retrieval.

An alternative embodiment, applicable in at least each of the foregoing contexts, incorporates a dithered secondary beam whose intensity is greater, and whose focused spot size is narrower, than the secondary beam configuration previously described. In this embodiment, the secondary beam is dithered—oscillated rapidly in a radial direction, in respect to the disc—while trough formation occurs. A variation of the latter embodiment comprises use of beam splitting to produce a plurality of overlapping, side-by-side non-dithering beams whose sum is a beam of essentially uniform intensity along all or a portion of its width. A further variation comprises beam dithering without beam splitting, where the single beam executes a complex dithering motion that is radial in respect to the disc (i.e., transverse, in respect to the longitudinal dimension of the formed features), and thus may produce pits and a trough simultaneously.

Also disclosed are methods by which the improved optical recording structure may be achieved. These include methods inherent in the various apparatus just described, as well as polymer cross-linking methods to provide an active layer less prone to berm formation and/or to formation of residual berms with undesirable radial width.

The invention may similarly be applied to non-disc structures. For example, in the case of optical data recording on cylindrical structures, the circumferentially spiral track corresponds to the essentially planar spiral track on an optical data recording disc surface. Here, the principles are virtually identical, except that the primary and secondary write beams are directed radially toward the rotational axis of the spinning structure, and dithering (or beam splitting), if applied, occurs in a direction parallel to the spin axis. Similarly, in optical recording on essentially two-dimensional data cards, where the write beam scans substantially parallel data tracks while the medium is not in motion, this dual-beam principal (with or without dithering or beam-splitting)—or the complexly-dithered, single beam concept—may be applied with suitable configuration and mechanical refinements. Likewise, in three-dimensional data wafers, which essentially comprise individually-readable, sandwiched layers of perhaps microscopically-thin data cards, the invention may be applied as in the case of data card embodiments, except that the writing process is conducted on multiple layers of the medium, where focusing and selection of the particular material(s) comprising the medium may be accomplished in a reasonably conventional manner, as may be further refined as development of data wafers progresses in the future.

The invention, in all its embodiments, can be applied equally in embodiments wherein each data mark is a bump or ridge extending above original surface level of the structure. In one sense, what appears as a pit or groove, when viewed from the one direction is a bump or ridge when viewed from the opposite direction (as is the CD-ROM/DVD-ROM case, where disc masters are first surface written and second surface read). Even more clearly, a disc stamper is the complementary image of the original master, and it therefore displays ridges or bumps where the master originally displayed grooves or pits, respectively. Generally, however, as is known to those with ordinary skill in the art, the conversion from pit/groove writing to bump/ridge writing depends only on conventional selection of parameters and/or waveforms, and the present invention, in variations within the basic concept, can be equivalently applied to either.

One such alteration, within the scope of the present invention, would comprise essentially inverting and otherwise appropriately processing the waveform (or waveforms) controlling the write beam, so that instead of causing expulsion of pit areas, expulsion would occur in land areas and, selectively, in areas between adjacent data tracks, thus preserving data bumps, relative to the now lowered land and inter-track areas. Other methods of raised feature creation will doubtless occur to those with ordinary skill in the art, based on the teachings herein, the published art and well-known principles of optical and circuit design.

The invention has been shown to be capable of virtually eliminating the berms typically surrounding data pits or (CD-R/DVD-R) tracking grooves in dye-polymer optical data recording. Indeed, this demonstrated reduction of berm height is sufficiently substantial that with careful parameter/ material selection and experimentation within the scope of the disclosed invention and by application of reasonable skill in the art, it appears possible to actually eliminate these berms altogether, thus even further improving HF detection. Here, each side of the radial section of the pit would be a continuous curve whose slope is monotonically negative from the surface level (or another defined level) of the structure to the base of the pit on one side of the pit and monotonically positive from the base of the pit back to the surface level (or other defined level) on the opposite side, and the pit section would not display any substantial slope discontinuity from one side to the other side. The latter would mean that the ratio of berm height to pit depth would be zero. In the case of a bump embodiment of the latter, the ratio of bump height to side channel depth would be infinite. CD-R/DVD-R groove sectional shape would, of course, be quite similar, as would tracking ridge sectional shapes, with similar ratios.

All embodiments of the invention share a single goal: to improve Figure of Merit in optical recording structures. The invention accomplishes this goal by providing three-dimensional features of improved transverse sectional shape in the data layers of these structures. Thus, the invention, in all of its many embodiments, constitutes a unitary concept.

Certain of these embodiments of the invention will now be described in reference to the Drawings

DETAILED DESCRIPTION OF THE PREFERRED EMBODIMENTS

For convenience, the ensuing discussion will initially concentrate on dye-polymer CD mastering in which EFM-coded data are represented as one or more tracks of pits and interspersed lands. Following the convention uniformly employed above, all directions in this context will refer to the disc itself. Accordingly, "radial" means toward or outward from the disc center, in the plane of the disc; "normal" means upward or downward from the plane of the disc; and "tangential" means along a tangent to the disc or along an annulus of the disc, in the plane of the disc. In respect to segments of the data track, "longitudinal" and "tangential" are synonymous, since, at a microscopic level, the data tracks will appear to be linear and radially adjacent ones will appear to be parallel; and "radial" and "transverse" are likewise synonymous. Also, a "track" of pits will mean any succession of a large number of pits and intervening lands, while a "sequence" will mean any plurality of pits and lands. A track of pits/bumps or a tracking groove/ridge may proceed essentially circularly around an annulus or annuli of the disc, or any of them may proceed along only an arc in the disc. All such configurations will be referred to as "circular," in a macroscopic sense.

Following this extensive discussion in the foregoing context, other embodiments will be discussed more briefly, to illustrate the fact that the invention is by no means limited to that context.

Figure 1:
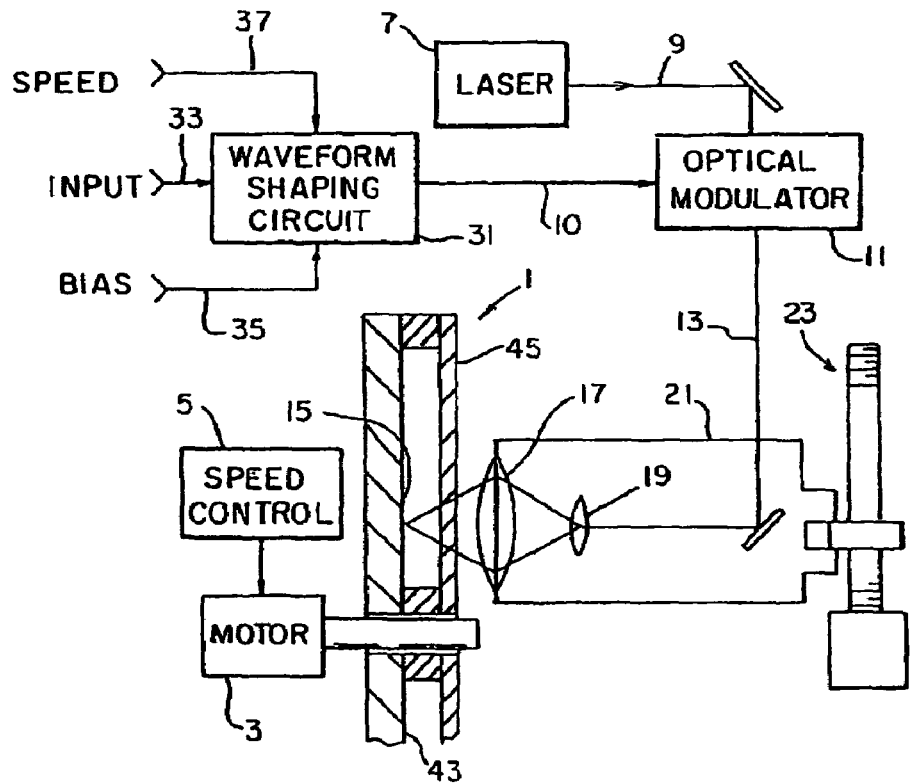
FIG. 1 is a generalized block diagram of an optical disc recording apparatus, without the improvements of the present invention, into which the preferred embodiment of the invention may be incorporated, where a gas laser write beam is employed.

Referring now to FIG. 1 and to the '129 patent, the disc 1 on which the data are recorded is rotated by a spindle motor 3, which is controlled by a speed controller 5. A gas laser 7 forms a write beam 9 of a particular wavelength. Because of the use of a gas laser in this embodiment, the write beam passes through an optical modulator 11, which varies the intensity of the write beam in accordance with a drive signal on line 10, from the waveform shaping circuit 31. As suggested above, the optical modulator 11 might, for example, comprise an AOM or, a faster-response EOM (electro-optic modulator). The modulated amplitude of the beam exiting the modulator will represent the amplitude of the drive signal and it will have an average intensity controlled by the drive signal DC bias and the intensity of the unmodulated beam 9.

The modulated beam 13 is directed to the disc 1 and is focused to a spot 15 on the active surface 43 by appropriate optics, as generally described above. These optics preferably include an objective lens 17 and a beam expanding (i.e., condenser) lens 19, which spreads the modulated beam 13 to fill the aperture of the objective lens 17. The numerical aperture ("NA") of the objective lens is chosen so that the diameter of this spot will be approximately 0.5 micron (in the case of CD recording), which is comparable to the wavelength of typical laser beams now employed. The lenses are mounted on a carriage 21 to allow radial movement of the spot 15 relative to the center of the disc 1. This is accomplished by means of a generalized translational drive system 23, whose details would be well within the skill of the ordinary practitioner.

Figure 2:
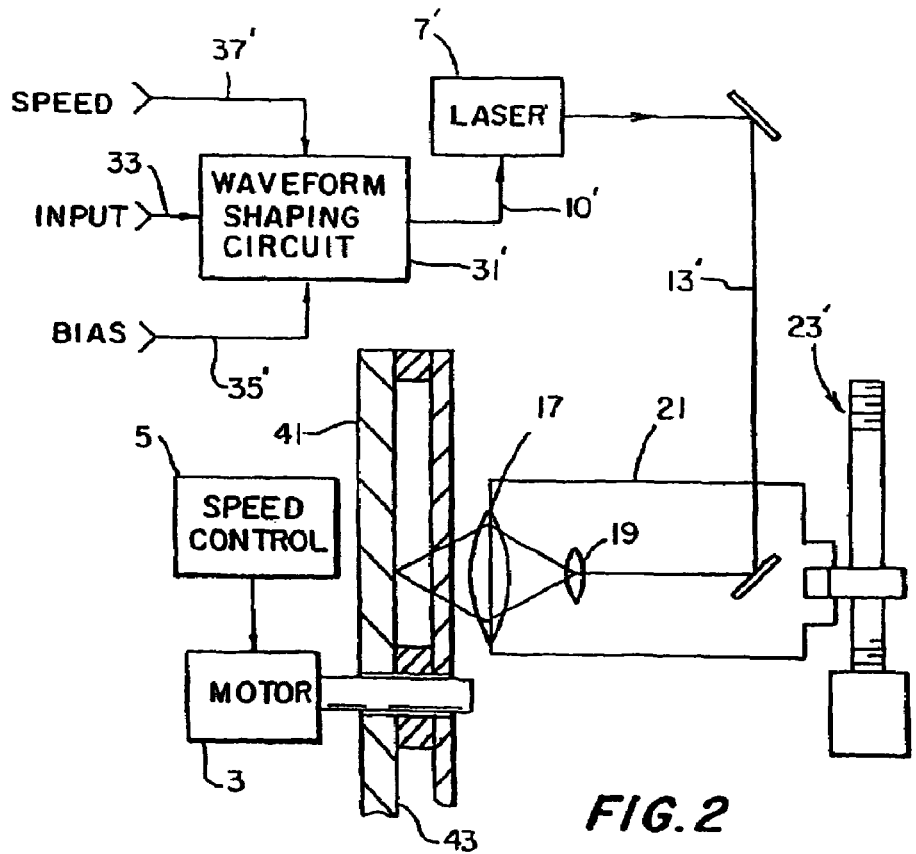
FIG. 2 is a generalized block diagram of an optical disc recording apparatus, without the improvements of the present invention into which the preferred embodiment of the invention may be incorporated, employing a solid-state laser write beam.

Alternatively, while FIGS. 1 and 2 illustrate radial movement of the spot 15 controlled by a translational system 23 that moves, while the axis of rotation of the disc remains stationary, the opposite might be true. That is, the carriage position could be fixed, in which case the disc apparatus would be moved to cause the axis of rotation of the disc to be translated radially, in synchronization with the timing parameters of the writing process. In either case, assuming proper tracking, the beam would be continuously moved, relative to the center of rotation of the disc, to generate the desired narrowly spiral data track(s).

In the preferred embodiment, the drive signal for the optical modulator 11 is formed by the waveform shaping circuit 31, as described in the '129 patent, whose purpose is to convert the sequence of EFM-coded data pulses and intervening "off" spaces into a resultant sequence of spaced drive pulses, the trailing regions of which each display a moderated decline in amplitude. This moderated decline may, for example, comprise a linear ramp, an exponential decay, a series of steps of progressively declining amplitude or a double-step (where the intermediate step is perhaps at half the "on" amplitude at the initiation of the trailing region). Other moderated decline profiles may also be employed in the trailing region, it being understood that the purpose of any moderated trailing region decline is to cause heat generation in the active dye-polymer layer 43 at the trailing end of formed pits to decrease more gradually than would otherwise result if these drive pulses displayed a single abrupt drop in amplitude from the "on" write level to the "off" base level. For convenience, every moderated trailing edge decline profile promoting that desired result will herein be interchangeably referred to as a "ramp."

An effect of any such trailing edge ramp is described in the '129 patent as causing the trailing ends of the formed data pits to become tapered, as the latter term is broadly defined above. The leading ends of the pits will already be tapered because a certain brief passage of time is required after the leading edge of a laser pulse (i.e., initial activation of the spot 15 at the active layer 43) before the full heat buildup is felt in that rapidly moving medium. This leading end taper can be blunted somewhat by boosting laser power at the pulse leading edge, as is commonly done, although it is essentially impossible to entirely eliminate it. Thus, a progressively broadening taper will form at the leading edge of the pit after the corresponding drive pulse is initiated. The moderated decline in amplitude at the trailing edge of the laser pulse will then result in a progressively narrowing taper at the trailing end of the pit, mirroring the taper at the leading end. This creates geometric symmetry between the selectively-tapered pit trailing and leading ends, which facilitates HF detection of the pit-land transitions, as disclosed in the '129 patent.

The present invention does not, of course, depend on inclusion of the teachings of the '129 patent, and improvements brought about by application of the present teachings will be realized, even if '129 patent principles are not included. However, it is believed that superior results are obtained if the present teachings are combined with those of the '129 patent.

Alternatively to, or in conjunction with, implementation of a trailing edge ramp or other trailing region decline in the drive signal pulses, the modifications taught in the '711 and/or '712 patents may be employed. The result—whether one, some or all of these improvements are employed—will be improved HF detection and, therefore, increased Figure of Merit.

The waveform shaping circuit 31 includes an input 33 for receiving the data to be recorded and may also include another input 35 for receiving a drive signal bias control for adjusting the average intensity of the modulated beam 13. Since the rotational speed of the disc varies in order to maintain constant linear speed of the spot 15 relative to the disc, the signal processing system may include a third input 37 for receiving a signal indicative of the instantaneous relative speed, perhaps generated from the speed control 5.

The disc 1 will generally include a substrate 41 and the active (dye-polymer) layer 43 coated onto the substrate. A transparent member 45 may be interposed between the active layer and the objective lens 17 to prevent dust and other contamination from settling on the active surface. Alternatively, the active layer may be formed on the inner surface of the transparent member, or any other convenient configuration of elements in the disc 1 may be chosen according to particular circumstances and preferences, which may feature first surface recording, as shown in FIG. 1, or second surface recording.

FIG. 2 is identical to FIG. 1 except that FIG. 2 illustrates the configuration that might be employed if a solid state (e.g., diode) laser 7' were utilized. Since a solid-state laser can respond virtually instantaneously to its drive signal input, no external optical modulator is required in this application. Rather, the output from the waveform shaping circuit 31' may, through line 10', constitute the direct drive signal for the laser 7'. Here, the modulated beam 13' is directly emitted from the laser 7'.

In the embodiment illustrated in FIG. 1, a single waveform shaping circuit 31 is shown. Of course, there could be a plurality of waveform shaping circuits collectively driving the optical modulator 11, perhaps through a suitable intermediary summing circuit. Likewise, in the embodiment illustrated in FIG. 2, a plurality of waveform shaping circuits 31', or a plurality of sub-circuits within the waveform shaping circuit, could be utilized. In either of the latter cases, each could be implemented to form, from the input 33' and/or from another input (not shown), a respective portion of the desired composite laser drive pulse (e.g., an amplitude boost at or near the pulse leading edge, a leading edge delay, or a trailing region amplitude decline ramp of any desired shape). These components could be summed by an intermediary element (not shown) or they could all be fed into the laser 7' through line 10', allowing the laser itself to act as a summing element.

Figure 3:
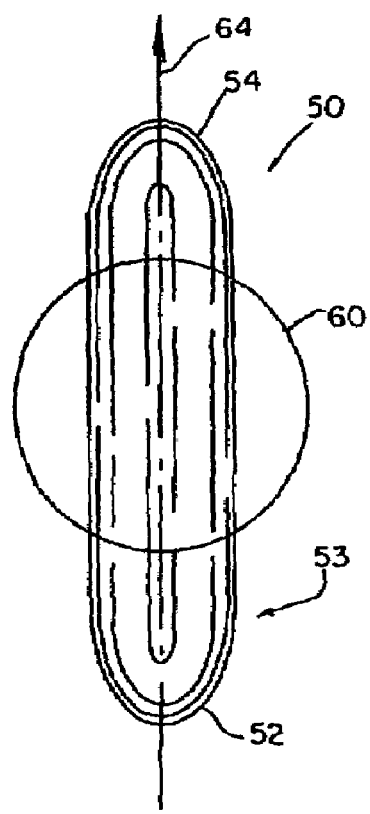
FIG. 3 a schematic plan view of a data pit, illustrating the parameters of single beam (PP) CD tracking.

As shown in FIG. 3 (where the arrow indicates the direction of disc rotation), the result, in accordance with either of these two alternative-laser embodiments, would be generation of a track of elongated data pits 50, each displaying a leading end 54, and trailing end 52 and a main portion 53, extending longitudinally along the pit axis 64. It will be observed, from FIG. 3, that the trailing end of a data pit, if produced in accordance with the teachings of the '129 patent, will be tapered as a mirror image of its tapered leading end. These elongated pit ends shown in FIG. 3 illustrate one typical shape included in the more general taper concept defined above and applied in reference to the '129 patent and the present invention. This provides a desirable, geometrically symmetric, tapered pit configuration to facilitate accurate detection of pit-land transitions, and thus to improve reliable retrieval of the successive pit and land lengths to reconstruct and de-code the original data recorded on the disc. Once again, implementation of these teachings of the '129 patent may be replaced by or used in conjunction with implementation of the teachings of the '711 and/or '712 patent(s), for improved HF detection.

FIG. 3 illustrates single beam (PP) tracking. Here, a single read beam 60 is utilized as the light source for HF and PP detection. The reflection of this beam is suitably passed to a conventional detector (not shown), in which the reflected beam is split into two equal, semi-circular components, separated by a division that is parallel to the tracking direction of the beam. As previously mentioned, HF detection comprises observing the instantaneous amplitude of light reflected perpendicularly from the disc surface—by summing the output of the two detector components—and pit-land transitions are registered when the quantity of detected light reaches an established value. Too much light indicates that the read beam is above a land area, while too little indicates that it is above a pit. PP detection comprises comparison of the light diffracted from the disc surface, as received in the two detector components, by subtracting the output of one detector component from that of the other, to produce a servo feedback to move the read beam radially until the two halves produce equal readings. FIG. 3 shows that the diameter of the read beam 60 is approximately double the width of the pit 50, as is generally the case.

Figure 4:
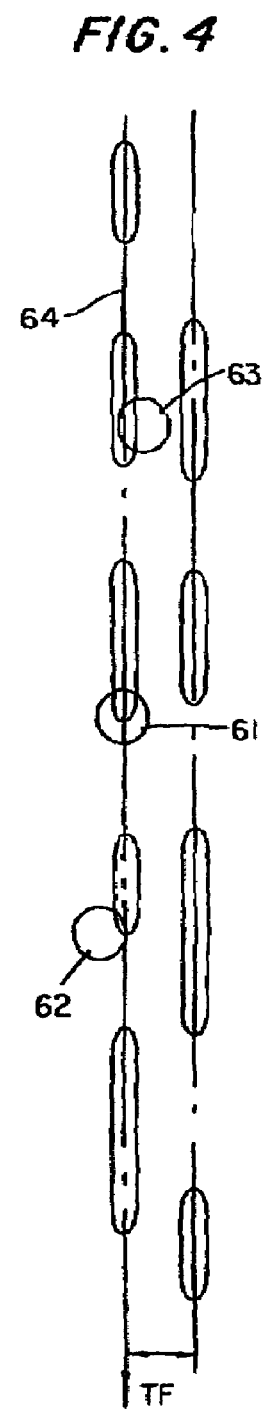
FIG. 4 is a schematic plan view of adjacent successions of data pits and intervening lands, illustrating the parameters of triple beam CD tracking.

FIG. 4 illustrates the commoner triple-beam tracking system, where three beams 61, 62, 63 are utilized. The central beam 61 is merely the read beam, corresponding to the read beam 60 in the single beam tracking system illustrated in FIG. 3. The forward beam 62 is offset by approximately ¼ of the track pitch, TP, to one side of the tracking axis of the tracking apparatus, while the rear beam 63 is offset by an identical amount to the other side. As discussed above, TP, the radial axis-to-axis distance between adjacent data tracks or track portions, is generally about three times the pit width, as shown. Unlike single beam tracking, the reflection from central beam 61 is not split, and serves only for HF detection. Tracking detection from the tracking sensors associated with the other two reflections (from beams 62 and 63) is compared, and appropriate radial adjustment is made continuously until the tracking axis aligns with the longitudinal axis 64 of the track of pits. Since HF and tracking detection with single-beam and triple-beam configurations are well known in the art, the respective apparatus need not be illustrated or further discussed.

Figure 5:
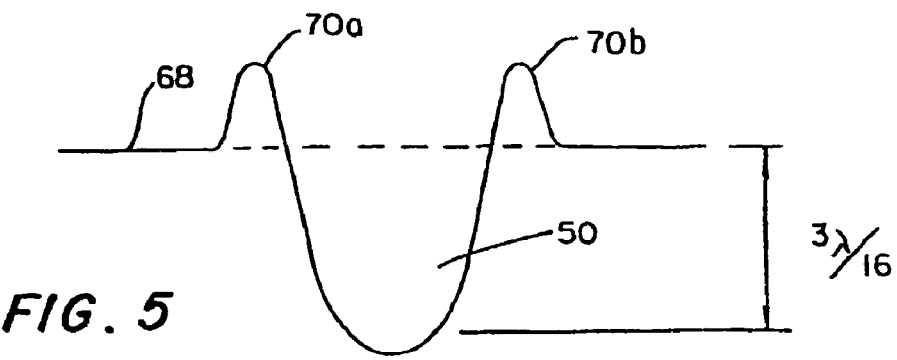
FIG. 5 is a transversely sectional view of a pit formed by the dye-polymer process without the improvements of the invention.

FIG. 5 illustrates the sectional configuration of a pit 50 produced by the dye-polymer method just described. It will be noted that berms 70a, 70b rise above the surface 68 of the disc. As explained above, this is a natural consequence of the plasticization component of the expulsion process by which these pits are created. In any event, their presence limits the Figure of Merit. It will be noted that the presence of these berms changes the effective phase depth of the pit. To provide effective HF detection with a reasonable tracking signal, the pit depth in this basic configuration is approximately $3\lambda/16$, as measured from the disc surface down to a point near the base of the pit. This optimizes neither HF detection (requiring a $\lambda/4$ depth) nor tracking (which requires a depth of $\lambda/8$).

Figure 6:
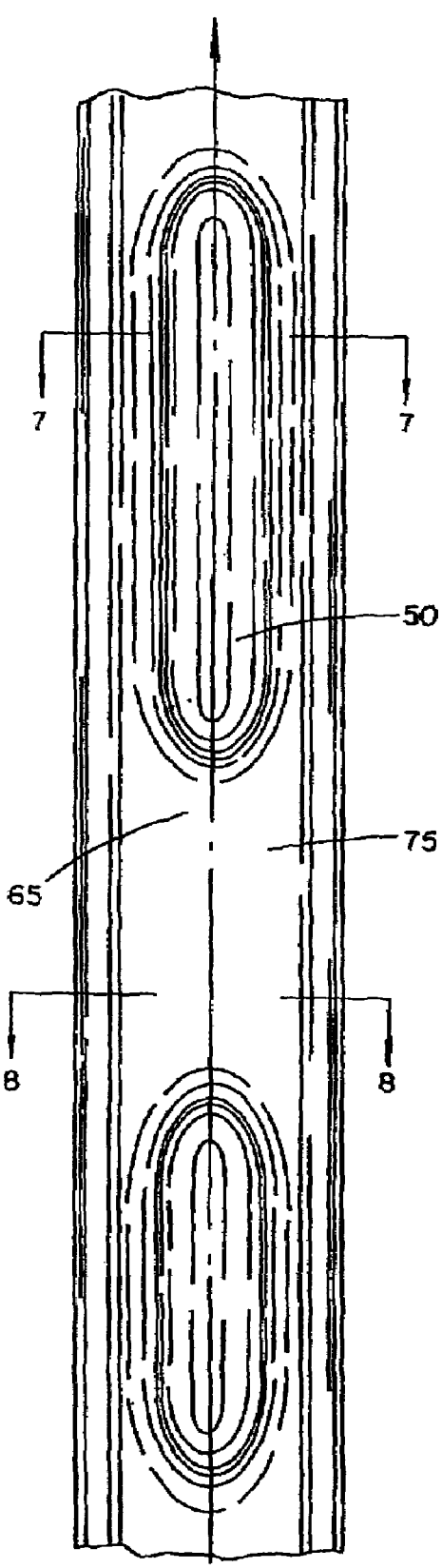
FIG. 6 is a plan view of a succession of two pits and intervening land area according to the preferred embodiment of the invention.

FIG. 6 illustrates the improved configuration of pits and intervening lands implemented by the preferred embodiment of the present invention. It will be seen that here a relatively wide, shallow trough 75 is provided, running along the longitudinal axis of the sequence of pits and lands, within which are the sequence of pits themselves. The width of this trough is greater than that of the pits. Accordingly, with this improvement PP tracking is facilitated by the increased width of the trough, which will be seen, by the single beam detector, in the same manner as a wider pit would be seen. Additionally, in such a single-beam environment, HF detection can be independently improved by providing optimal, relatively narrower and deeper pits, without regard to the conflicting requirements of PP tracking, which may now be independently optimized by provision of the wide, shallow trough. Such narrower pits within relatively wide, shallow troughs offer the additional benefit of reducing HF cross talk (an element of the Figure of Merit) between radially adjacent data tracks. It is this independent optimization of HF and PP detection, reduction of cross talk and consequent improvement in Figure of Merit that characterizes this embodiment of the invention.

Figure 7:
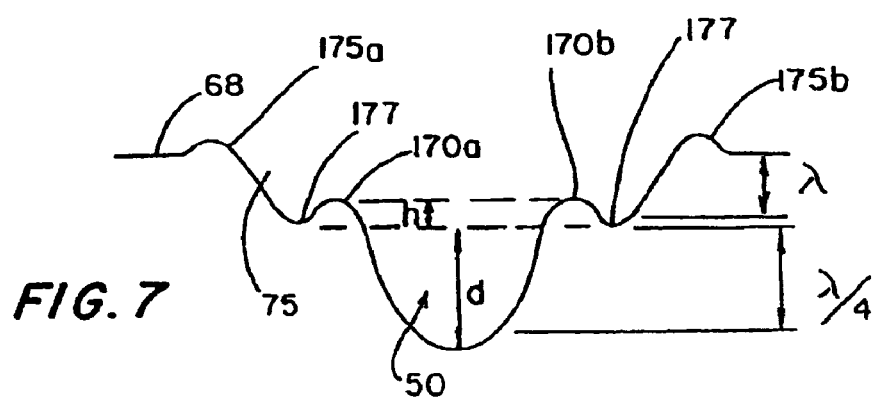
FIG. 7 is a transversely sectional view of a pit incorporated within a trough, formed according to the invention, taken through section 7—7 of FIG. 6.

Indeed, HF detection can actually be further improved by this means. If the trough 75 is implemented by the method described below, the berms 70a, 70b can be greatly reduced in height, if not entirely eliminated, as shown in FIG. 7. This provides a pit shape whose effective phase depth could be made to coincide more closely with the optimal $\lambda/4$, than might be possible without the improvements offered by this invention. Thus, the HF detector would see the bottom 77 of the trough 75 as it would otherwise have seen the disc surface, itself, and would thus see a practically berm-less pit of the proper width and an effective phase depth providing the desired $\pi$ phase shift. At the same time, the PP detectors would see a "pit" with a desirably greater width, and whose effective phase depth is closer to the $\lambda/8$ required for the optimal $\pi/2$ phase shift for PP detection.

FIG. 7 shows that the ratio of the height h of the berms 170a,b to the depth d of the pit 50 is considerably less than in the section shown in FIG. 5, which does not incorporate any of the improvements of the present invention. These vertical dimensions are measured from the vertical index level of the point 177 at which the right berm 170b begins to rise above the trough level 77. As well as improving Figure of Merit, the reduction in berm height, thus realized, also facilitates accurate replication in mastering applications by reducing the quantity of material that might tend to cling to shallower crevices displayed in the resulting stampers.

It will also be seen, from FIG. 7, that smaller berms 175a,b rise from the surface 68 of the disc at the respective edges of the trough 75. But these will have little effect on PP or HF detection.

Figure 8:
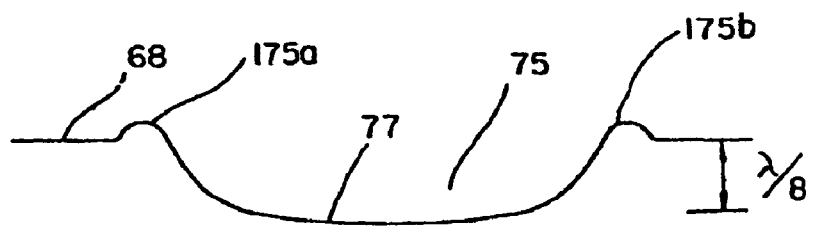
FIG. 8 is a transversely sectional view of the land area according to the invention, taken through section 8—8 of FIG. 6.

As shown in FIG. 6, the trough 75, itself, could continue in the land areas of the track of pits and lands at an effective depth of $\lambda/8$, facilitating tracking between pits by providing a wide, relatively flat bottom 77 of the trough of consistent depth through its entire width, as shown in FIG. 8. This would solve the problem only partially addressed by Schoofs, whose disclosed land area groove (created by reducing the between-pit write intensity to generate a just-above-threshold condition in the moving medium) is too narrow for optimized PP detection, and which, by logical extension, would inhibit HF detection of the pit/land transitions if the between-pit groove were widened (and deepened) by a less extreme write intensity reduction. Additionally, pit/land transitions can be more accurately detected in the configuration shown in FIG. 6 than in the Schoofs configuration, because each pit now terminates in a relatively flat trough bottom, rather than in a narrow groove whose reflectivity does not match that of the disc surface.

Figure 9:
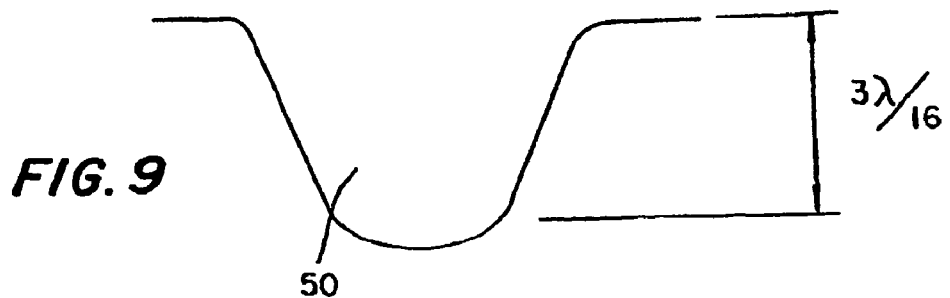
FIG. 9 is a transversely sectional view of a pit, according to another embodiment of the invention.

Virtually berm-less pits 50, as shown in FIG. 9, may be created by adjusting the parameters to cause a slight increase in trough width, together with a corresponding slight increase in the width of the pit formed within the trough. These parameters include beam intensities and diameter, which may be adjusted individually or jointly to achieve the following results.

Proper selection of trough width can cause one of the two berms forming in the new trough to overlap the downward slope of the adjoining berm of the already formed, radially adjacent trough. In other words, the two adjacent berms will merge to form a flat-topped region between the adjoining troughs. This process repeats itself over and over as further radially adjacent troughs are created, resulting in flat areas between all radially adjacent track portions.

Proper selection of the width of the pit within the trough causes the berms in the pit forming within that new trough to be eliminated in a similar manner. If the parameters are adjusted to cause the pit to be only slightly narrower than the trough within which it is being created, the berms forming at either side of the new pit will coincide with the downward slopes of that trough. This eliminates both of those pit berms.

The resulting profile essentially becomes the superposition of the profiles of the trough and the pit formed within it. In effect, therefore, the trough resulting from these two adjustments becomes the pit, only somewhat wider, and now berm-less. This result has been shown to occur through repeated experiments, and can be optimized by fine adjustment of the parameters.

FIG. 9 illustrates the latter embodiment of the invention. As described above, in this embodiment there is no trough at all, and the resulting pit 50 is rendered essentially berm-less, and with a shallower slope on either side. That facilitates PP tracking without compromising HF detection. Tracking detection is improved because the shallower side slopes tend to reflect a greater proportion of incident light away from the vertical. Yet HF detection is not compromised at all, because pit depth is maintained at the conventional $3\lambda/16$. The net result is an overall improvement in Figure of Merit, which is the goal of the present invention.

Likewise, reduction in berm height—and, particularly, effective elimination of berms by careful parameter selection, as described herein—will reduce cross talk between adjacent data tracks. This is particularly true in present and future applications featuring relatively narrower track pitch, which this embodiment of the invention particularly facilitates.

Thus, Figure of Merit in CD mastering applications may be improved by the present invention even without the added PP-facilitating trough. Furthermore, such a trough-less, berm-less pit, as shown in FIG. 9, would be nearly ideal for pre-groove applications, such as unrecorded CD-R/DVD-R mastering, whereas the embodiment shown in FIG. 7 might not be as desirable for that particular application.

The inventors have developed a number of methods and corresponding apparatus for implementing various embodiments of the present invention. Those involving trough formation will first be discussed.

For example, the trough 75 could be implemented along the entire track of pits and lands by splitting the write beam 13, 13' into two beams impinging on the active surface 43 of the disc 1 while the latter is spinning. Alternatively, the trough-writing beam could be activated only during land periods (i.e., from the end of the trailing region decline of one pit-writing pulse until the initiation of the leading edge of the next pit-writing pulse). Also, if desired, the trough-writing pulse could be selectively activated and de-activated at any times and for any durations during the pit writing process, as conditions and preferences might dictate. Unless the trough-writing beam is maintained in an "on" condition during the entire process of writing a track of pits (or portion of a track), some means must be provided to activate the trough-writing beam in coordination with the pit-writing beam. As shown in FIGS. 13–16, as discussed below, this could easily be done by providing an output from the optical modulator signal 10 or from the laser drive signal 10' to control an optical modulator in the path of the trough-writing beam, with suitable, conventional circuitry to synchronize activation of the two beams.

Figure 10:
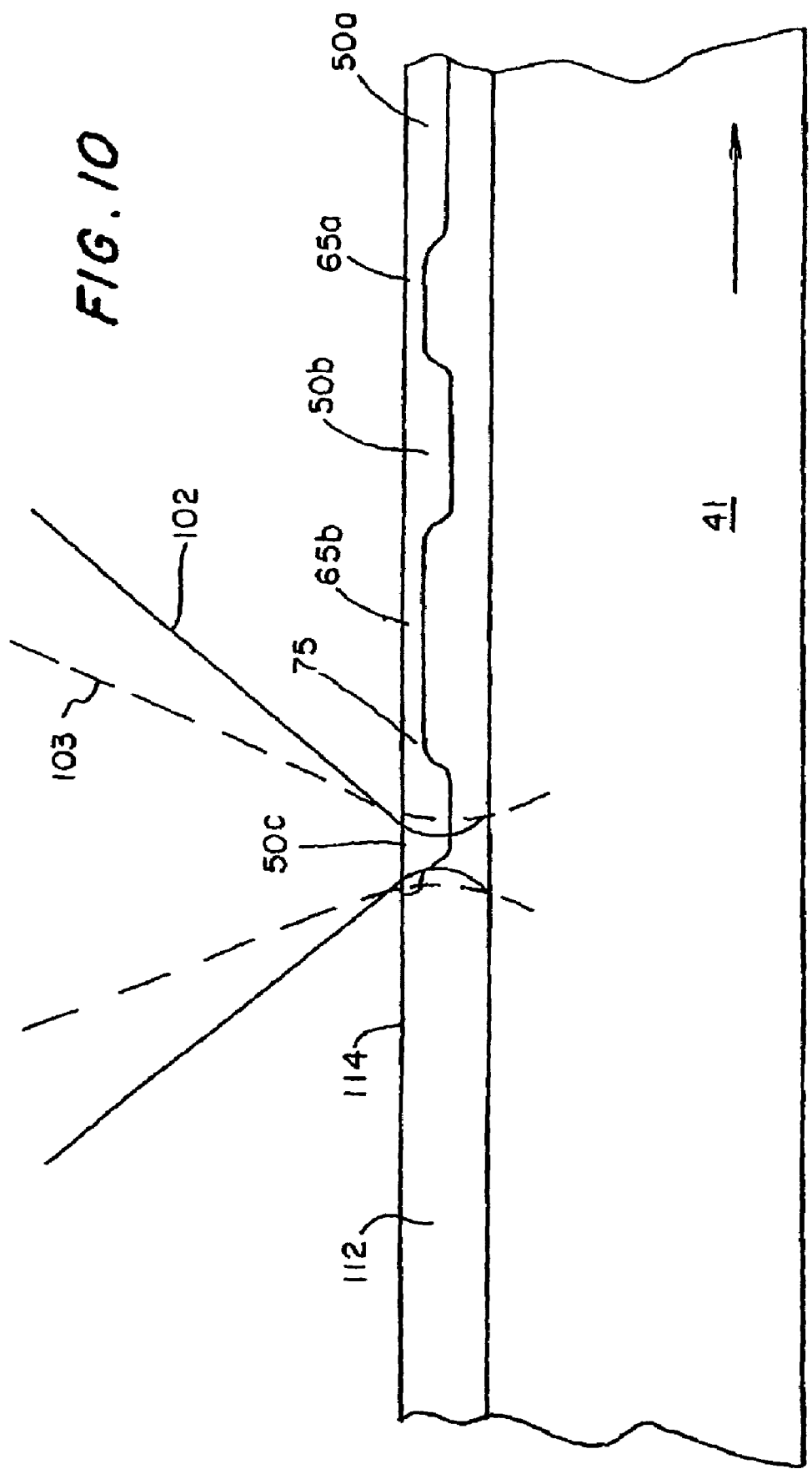
FIG. 10 is longitudinally sectional view of a disc according to an embodiment of the invention with superimposed trough and pit forming beams.

FIG. 10 illustrates the situation where the principal pit or groove writing beam 102 and the trough writing beam 103 are superimposed, so that the data marks or grooves are created simultaneously with the trough within which they are contained. In the tangentially-sectional view shown in FIG. 10, it can be seen that a succession of pits 50a,b,c and intervening lands 65a,b,c are formed within the optically-active layer 112 supported by the substrate 41 of the disc 1. Here, the pits are entirely within the formed trough 75, i.e., the upper surfaces of the pits are within the trough and are below its upper surface 114 (the unrecorded surface of the disc). In the embodiment shown in FIG. 10, the land portions 65a,b,c of the data track are likewise contained within the trough.

In the embodiment illustrated in FIG. 10, the trough-writing beam is "on" during the entire recording process. Once again, the trough-writing beam might selectively be activated only during the period between formation of successive pits, to form only troughed land areas 65 along the data track. This would have no effect on the HF or tracking of the pits, but tracking between pits, i.e., in the land areas, would be improved for the reasons discussed above. Alternative embodiments might involve selective formation of the trough by correspondingly controlled input to the means by which the trough-writing beam is created, as will be discussed below.

Figure 11:
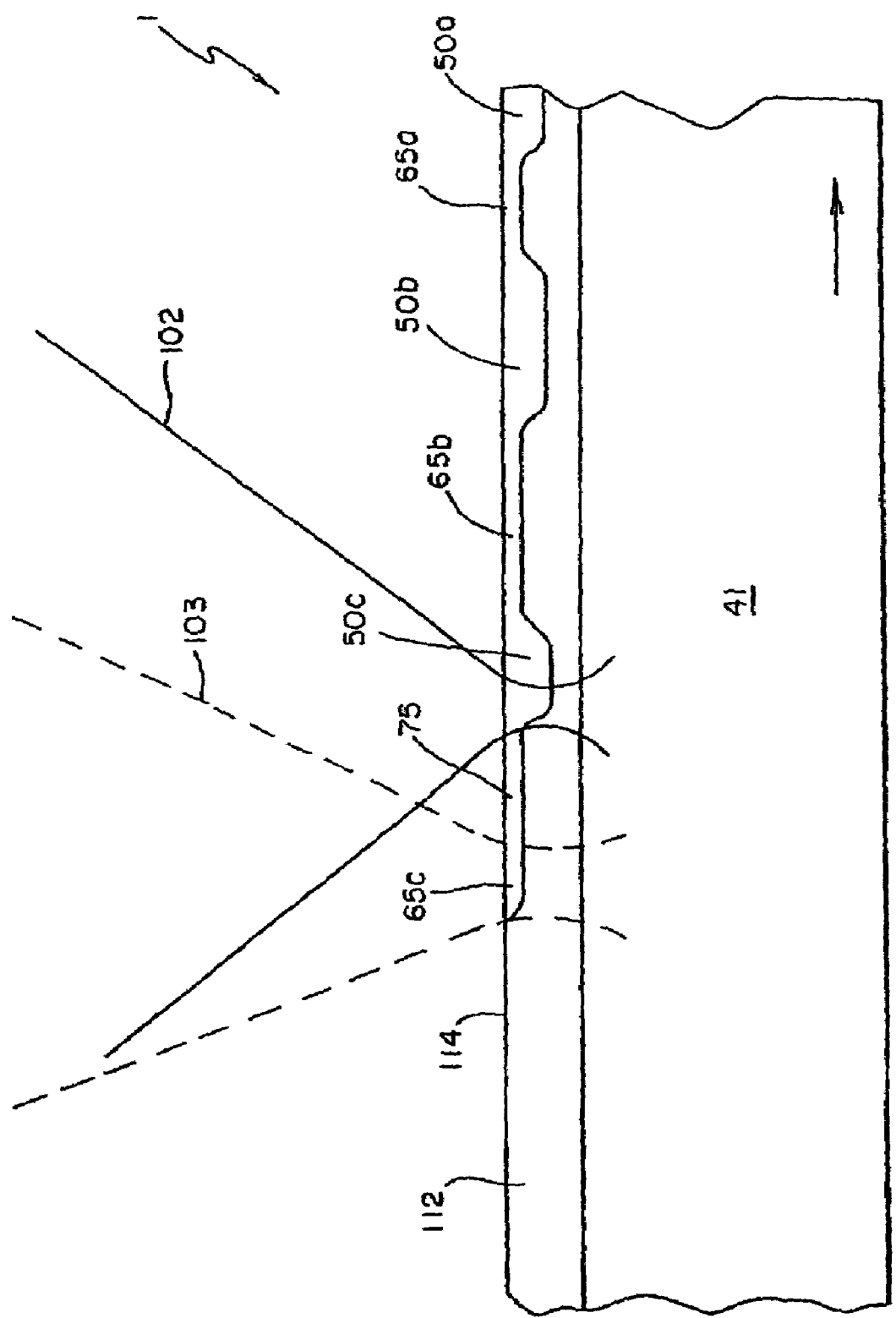
FIG. 11 is a longitudinally sectional view of a disc according to an embodiment of the invention wherein the trough-forming beam leads the pit-forming beam in pit production.

FIG. 11 differs from FIG. 10 only in that in FIG. 11, the trough-writing beam 103 leads the principal writing beam 102. In all other respects, this embodiment is similar to that illustrated in FIG. 10, and all comments in reference to FIG. 10 apply equally to FIG. 11.

Figure 12:
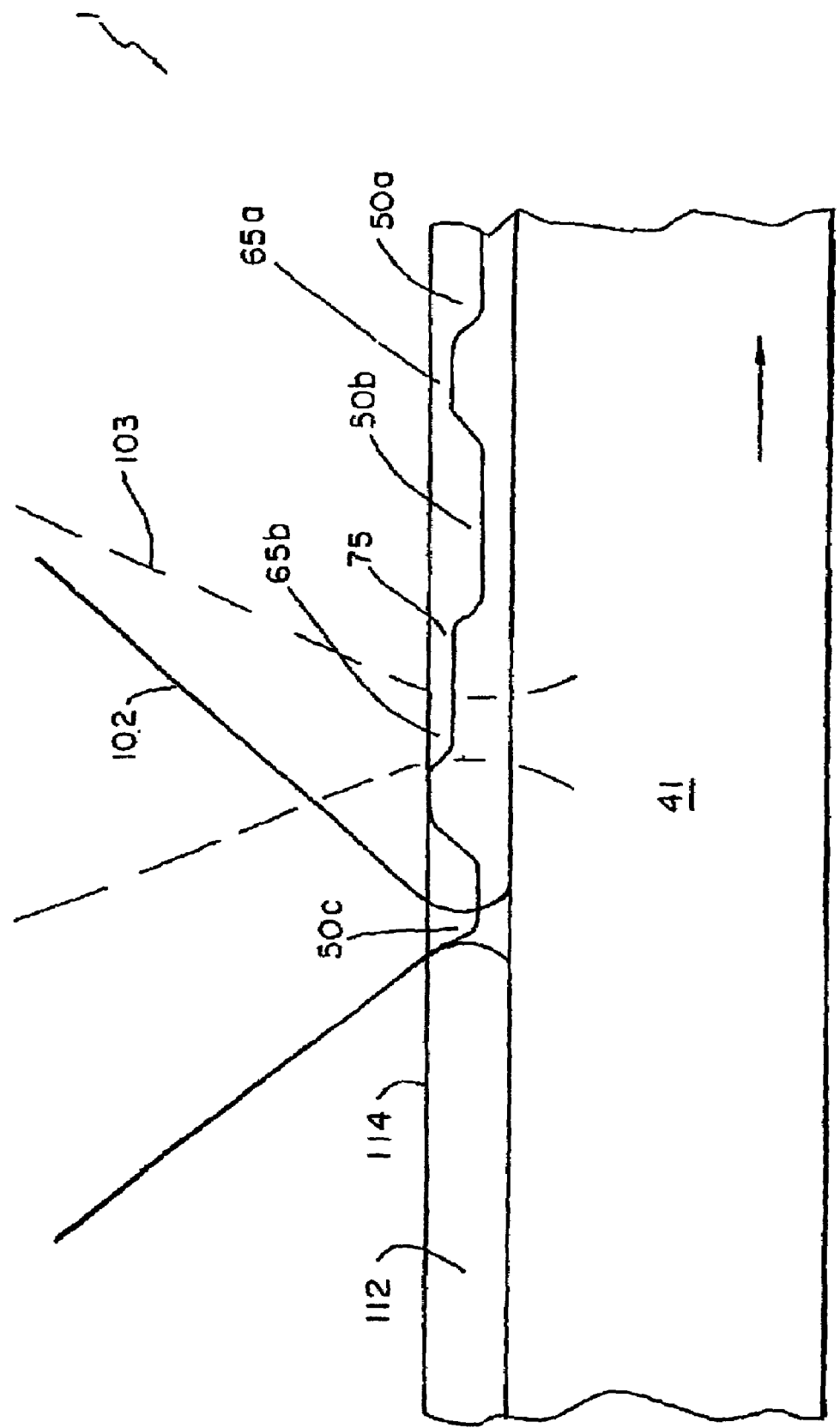
FIG. 12 is a longitudinally sectional view of a disc according to an embodiment of the invention wherein the trough-forming beam lags the pit-forming beam in pit production.

FIG. 12 illustrates the situation where the principal writing beam leads the trough-writing beam. It will be seen that here the pits are formed prior to formation of the trough in which they will eventually reside. The effect of the later-formed trough is to uniformly expel further material from the formed pits, without significantly changing their configurations. It is as if the already formed pits are pushed down into the newly formed trough, while maintaining their respective configurations.

All comments in respect to FIGS. 10 and 11 apply correspondingly to FIG. 12, and it will be understood, in this and every succeeding context, that the identical methods can be employed in generation of tracking grooves in groove-mastering applications. In respect to the latter, in the embodiment illustrated in FIG. 12, the initially-formed groove, created by principal beam 102, would be deepened, i.e., caused to occupy a position in the optically-active layer 112 further below its upper surface 114, by the succeeding effect of the trough-writing beam 103, without significantly changing its transverse sectional shape.

The manner in which these two beams may be formed and controlled will now be discussed.

Figure 13:
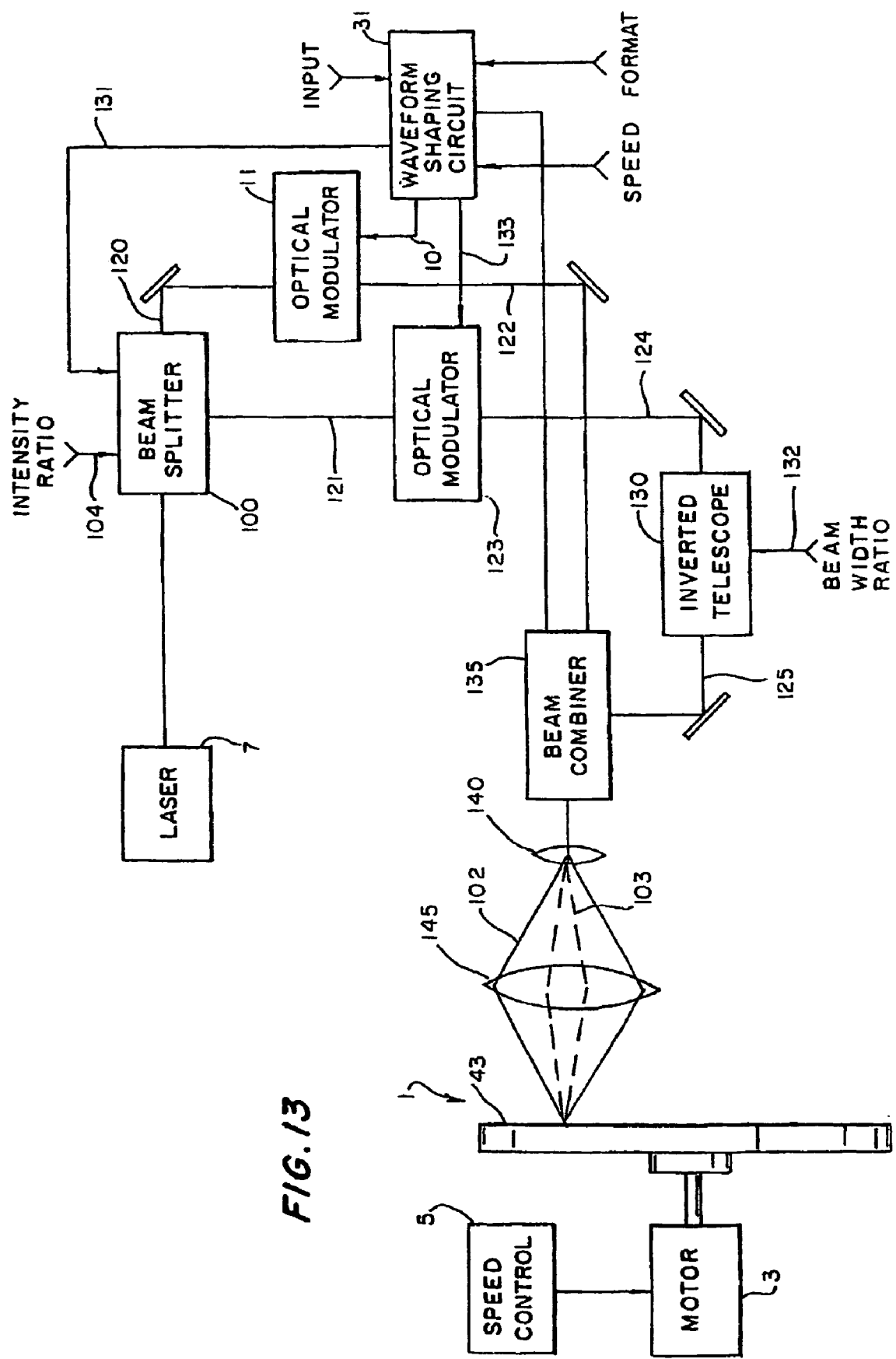
FIG. 13 is a generalized block diagram of an optical data recording apparatus according to the preferred embodiment of the invention, illustrating beam splitting to provide a data write beam and a tracking write beam, in reference to the apparatus shown in FIG. 1.

FIG. 13 illustrates the principal embodiment of the invention, corresponding, in its utilization of a gas laser and external optical modulation, to the apparatus shown in FIG. 1. Here the output beam from the write laser 7 enters a beam splitter 100, by which it is divided into two beams 120 and 121, respectively. Beam 120 is the primary (pit or groove) writing beam and beam 121 is the secondary beam, the former being the source of the data writing beam 102, while latter is the source of the trough-writing beam 103. One input to the beam splitter 100 is a signal 104 defining the desired intensity ratio of the two resultant beams. Such beam splitters are well known in the art, and might, for example, be based on (1) half-wave plates in combination with a polarizing beam splitter; (2) an acousto optic deflector; or (3) an electro optic retarder in combination with a polarizing beam splitter.

The principal beam 120 enters an optical modulator 11, whose action is controlled by the waveform shaping circuit 31 described above in the context of FIG. 1, and whose effect is also described in that context. It will be noted that in FIG. 13 and additional input to the waveform shaping circuit—Format—is shown. The latter is merely the input induced by the particular operation in which the apparatus is employed, whether it be data mark formation or cutting of a continuous or discontinuous groove or some other application to which the invention might be applied by those with ordinary skill in the art. The nature of the input and the waveform shaping circuitry to process it would be dictated by the particular application, in a manner well within the capability of a circuit designer of ordinary skill, based on these teachings.

One output from the waveform shaping circuit 31 is a signal 131 directed to the beam splitter 100 to control the extent and timing of the beam splitting operation. In some applications, beam splitting will occur substantially continuously. In others, it will be desired to intermittently divide the input beam into the two emergent beams. This action could be controlled by the waveform shaping circuit 31, as shown, or by some other input to the beam splitter or by an input to the source of the intensity ratio input to the beam splitter 100. Since the purpose of this input is clear, it is assumed that the ordinary practitioner could easily devise other means to accomplish it.

The secondary beam 121 is directed to another optical modulator 123, likewise controlled by the waveform shaping circuit 31, through line 133. The modulated beam 124 from this optical modulator is directed to an inverted telescope 130, whose purpose is to reduce the diameter of that beam by a desired amount, according to the beam width ratio input over line 132, to generate an output beam 125. The primary beam 122 and the output beam 125 are combined in a beam combiner 135, whose purpose is to align the two beams for further processing. The beam combiner is entirely conventional, and might comprise a dielectric beam-splitter. Alternatively, a half-silvered mirror set at an appropriate angle (approximately 45°) might be used.

The two emergent beams are passed through a condenser lens 140, which expands the trough-writing beam 103 (derived from the secondary beam 125) and the data beam 102 (derived from the primary beam 122) and directs both beams to the objective lens 145. It will be recalled that the inverted telescope 130 has narrowed the modulated beam 124 to generate the output beam 125 directed to the condenser lens 140. Because of this narrowing, the resultant trough-writing beam 103 does not completely fill the input pupil of the objective lens, effectively reducing its NA, with the result that the latter will not be focused into as small a spot as will the data beam 102, which fills the objective lens. Thus, the relative diameters of the two beams at the disc surface 43 will result in formation of a trough 75 whose width is greater than that of the pits 50, as shown in FIG. 6, as the disc I is spun by its spindle motor 3, the latter governed by a suitable speed control 5 to insure constant linear velocity.

Of course, the actual dimensions of the two final beams will depend on the parameters governing their upstream processing, notably in proper selection of the reduction factor of the inverted telescope 130 and the parameters of the two lenses 140,145. Likewise, all or a selective portion of the required optics will be supported by an apparatus (not shown) similar in function and purpose to the carriage 21 shown in FIGS. 1 and 2—or some other means for relative radial motion between the beams and the disc axis will be provided, as discussed above—to insure that the data track is properly positioned on the disc. But these expedients are certainly within the skill of the ordinary practitioner, based on the teachings herein and in the pertinent art.

Figure 14:
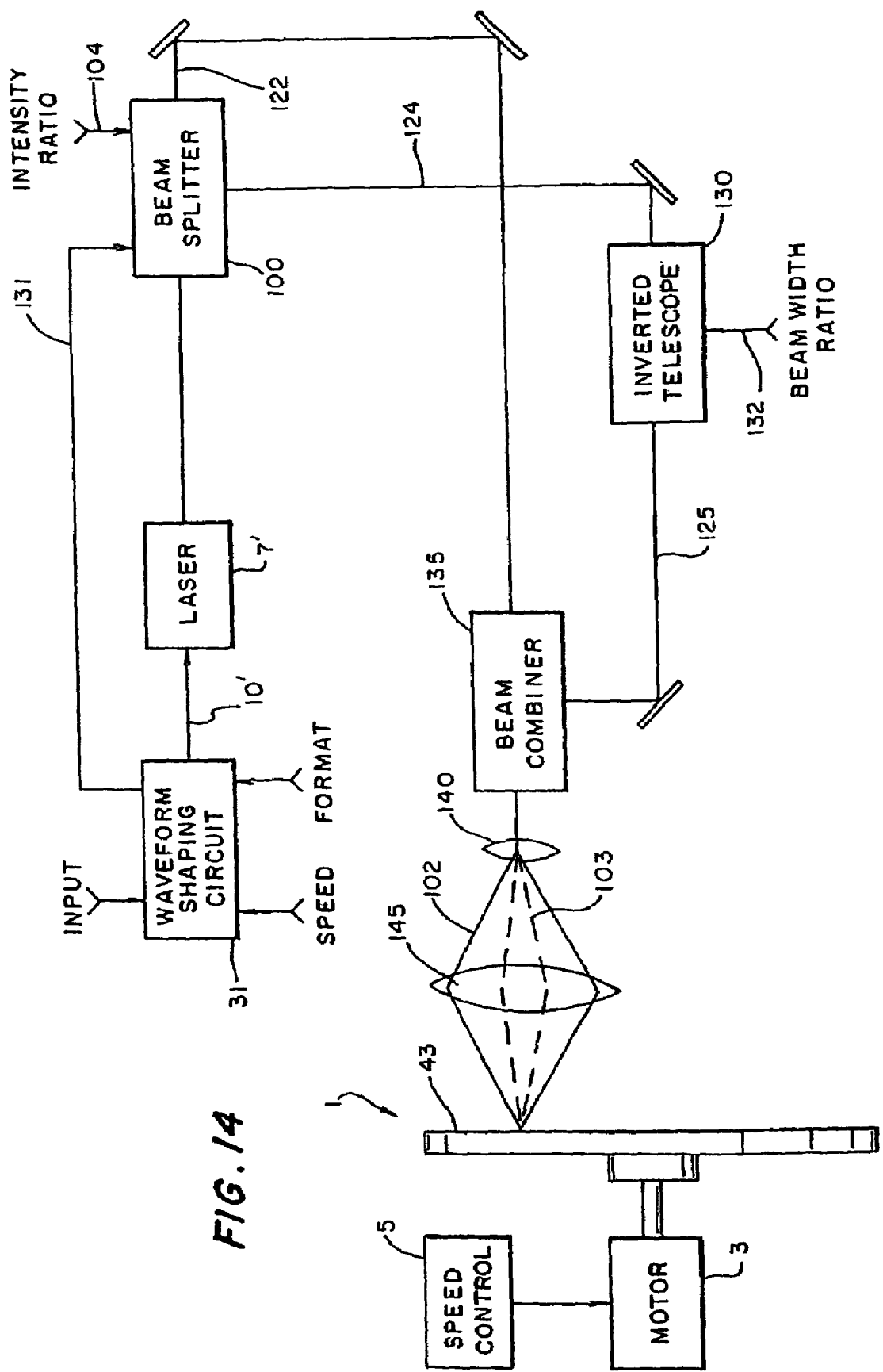
FIG. 14 is a generalized block diagram of an optical data recording apparatus according to another embodiment of the invention, in reference to the apparatus shown in FIG. 2.

FIG. 14 illustrates the same configuration of the invention as shown in FIG. 13, but in reference to the apparatus shown in FIG. 2, wherein a diode laser is employed. All comments made in reference to FIG. 13 apply equally to the embodiment shown in FIG. 14, except, of course, those made in respect to the optical modulators shown in FIG. 13. Like FIGS. 13 and 15, trough-writing beam 103 is focused at the active surface 43 of the disc 1. However, due to the smaller NA of the trough-writing beam, its spot size is larger than that of the principal beam 102, in order to produce a trough of desired width exceeding that of the data pits. In CD applications, with a pit width of ≈0.5 micron, the spot size of the trough-writing beam at the disc surface might be ≈1 micron.

Figure 15:
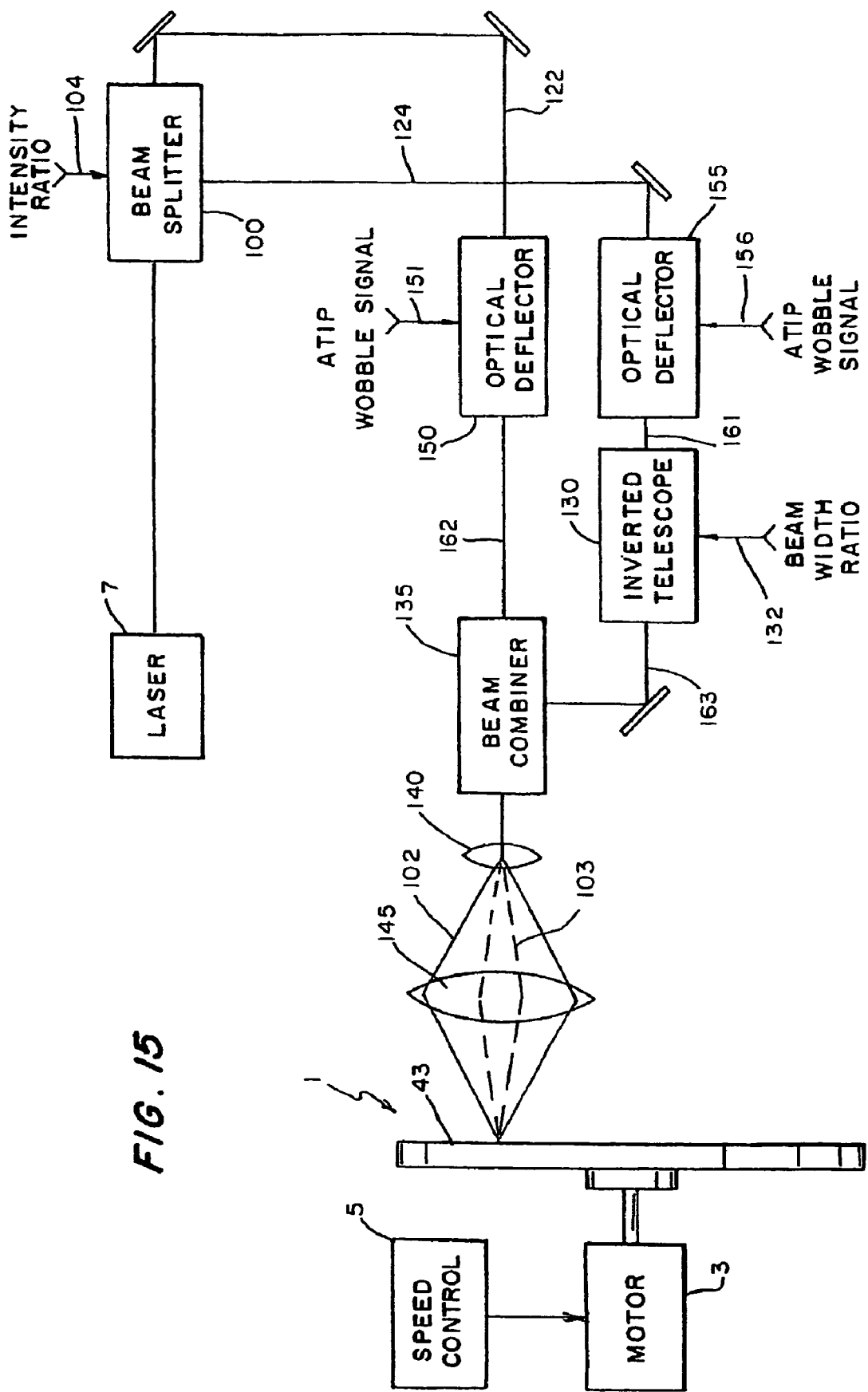
FIG. 15 is a generalized block diagram of an optical data recording apparatus according to yet another embodiment of the invention, in reference to the apparatus shown in FIG. 1.

FIG. 15 illustrates yet another embodiment of the invention, which addresses the need, in mastering of CD-R blanks, to create required wobble in the spiral tracking grooves produced in the master disc. This embodiment incorporates a pair of optical deflectors for that purpose. All other elements of this embodiment are similar to, and identically identified, with corresponding elements shown in FIG. 14 (except that there is no waveform shaping circuit in this embodiment, since the groove is principally created with a constant-intensity beam).

As shown in FIG. 15, a first optical deflector 150 is interposed in the path of the principal beam 122. Its purpose is to selectively oscillate the beam, by action of the ATIP (absolute time in pre-groove) input through line 151, to produce a wobbled principal emergent beam 162, which will result in the track-writing beam 102. That ATIP input will, in a manner well-understood by those familiar with CD-R mastering, include all the parameters for a correct wobble to be introduced into the spiral groove, as discussed above. A second optical deflector 155, likewise controlled by the same ATIP input signal (over line 156), similarly induces the desired wobble into the beam 124. That will produce output beam 161, which will, upon passage through the inverted telescope 130, result in the secondary emergent beam 163, which will, in turn, result in the trough-writing beam 103. Preferably, optical deflectors 150,155 are both acousto-optical deflectors. Of course, both deflections must be carefully synchronized and weighted, and this is best accomplished if the ATIP wobble signal to optical deflectors 150,155 comes from a single source, as suggested above.

It will be understood, by those with ordinary skill in the art, based on the present teachings, that the intensity of the trough-writing beam may be varied to cause the depth of the resulting trough to be correspondingly varied. This variation in beam intensity can, for example, be readily accomplished by selective control of the intensity level of the output beam 161 directed to the inverted telescope 130, from which emerges the secondary emergent beam 163. This is done by selecting the laser power and the intensity ratio input to the beam splitter 100. In any event, the ultimate intensity of the trough-writing beam can readily be selected to provide an effect, in the active layer, which varies from production of a full-depth trough, as above described, to merely a berm-removal expedient. The latter would require beam intensity sufficient to produce, in the moving, active layer 43, a level of heat generation only slightly above its thermal threshold, while the former would require a suitably greater intensity. These adjustments, to produce any desired result, would be well within the ability of the ordinary practitioner, based on the teachings herein.

Those familiar with dye-polymer optical data recording will observe that, all else being equal, the trough that would be created by the trough-writing beam would tend to have a curved base, when viewed in section transverse to the track axis. This is because, like the principal pit-writing beam, the intensity cross-section of the essentially circular beam would approximate an Airy Disc distribution along its diameter, with the greatest intensity nearest its center. In some applications, however, a more flat-bottomed trough, as shown in FIG. 8, might be desirable, particularly as this might improve tracking by providing a uniformly λ/8 phase depth along the base of the trough.

Figure 16:
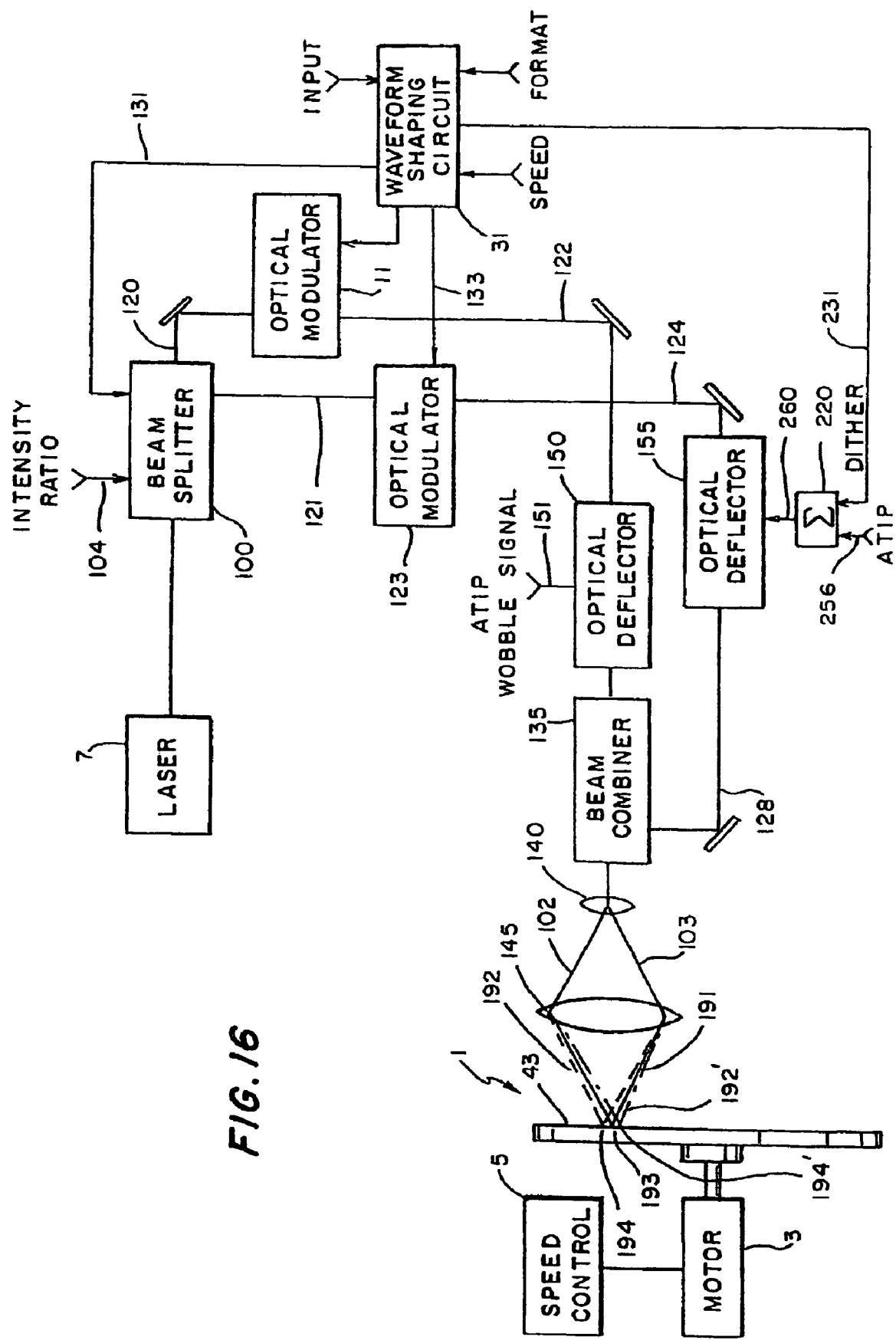
FIG. 16 is a generalized block diagram of an optical data recording apparatus according to yet another embodiment of the invention, in reference to the apparatus shown in FIG. 1, in yet another embodiment of the invention.

FIG. 16 illustrates an apparatus for generating such a relatively flat-bottomed trough, by causing the trough-writing beam to dither (i.e., rapidly oscillate transversely to the axis of the track of pits) during relative motion of the trough- and pit-writing beams along the track. It will be noted that FIG. 16 is directed toward the configuration shown in FIG. 13, in turn relating to the apparatus shown in FIG. 1, employing a gas laser requiring external optical modulation. It is assumed that a practitioner of ordinary skill could easily adapt its teachings to the apparatus shown in FIG. 2 (i.e., to the embodiment shown in FIG. 15), wherein a diode laser is employed, based on the teachings herein and principles well known in the art.

FIG. 16 is actually a dual-mode apparatus. In the CD mastering mode, the ATIP signals over lines 151,256 are de-activated, since CD mastering requires no wobble creation. In the CD-R mastering mode, the ATIP signals are activated, but the optical modulators 11,123 merely transmit beams of selected constant intensity during all or any portion(s) of the track-forming process. Whichever the case, the input to the optical deflector 155 over line 260 derives from an ordinary signal combiner 220, whose input is whichever of those signals might be activated at the time.

All elements shown in FIG. 16 have already been discussed, and the only material difference between the embodiments shown in FIGS. 15 and 16 (other than the imposition of external optical modulators 11 and 123 in FIG. 16, a gas laser embodiment) is the additional dither input to the optical deflector 155 over line 231. In the CD-R mastering mode, the dither input causes the optical deflector to execute a complex oscillation of the secondary beam 124, which is a combination of the relatively slow ATIP wobble and the faster dither. This dither input may be provided by a conventional oscillator circuit, synchronized with an output from the waveform shaping circuit 31, in a manner well within the capacity of an ordinary practitioner.

The output from the beam combiner 135 consists of two superimposed beams that pass through the condenser lens 140 and on to the objective lens 145. Emerging from the objective lens are two beams 191,192. Beam 191 (shown in solid line) is the un-dithered beam, which is focused onto the active surface 43 of the disc 1 at point 193. The other beam 192 (shown in dotted line) is the dithered beam, which is focused instantaneously at point 194. However, since beam 192 is dithered, its point of focus moves rapidly in a radial direction (relative to the disc—i.e., up and down in FIG. 16), crossing and re-crossing the focal point 193 of the un-dithered beam 191, reaching point 194', for example. It will be understood by those with ordinary skill in the art that the extreme radial movement of the focal point of dithered beam 192, to either side of the focal point of beam 191, is only of the order of a micron, and that FIG. 16 necessarily greatly magnifies this range of movement for clarity.

In another embodiment of the invention, where no dithering takes place, a relatively flat-bottomed trough is created by substituting a diffraction grating (or other ordinary diffractive element, such as a phase grating) for the inverted telescope shown in FIGS. 13–16. The grating converts the trough-writing beam 124 from the beam splitter 100 into two images, mutually displaced slightly, which together constitute a single, broadened laser beam impinging on the optically active surface.

Figure 17:
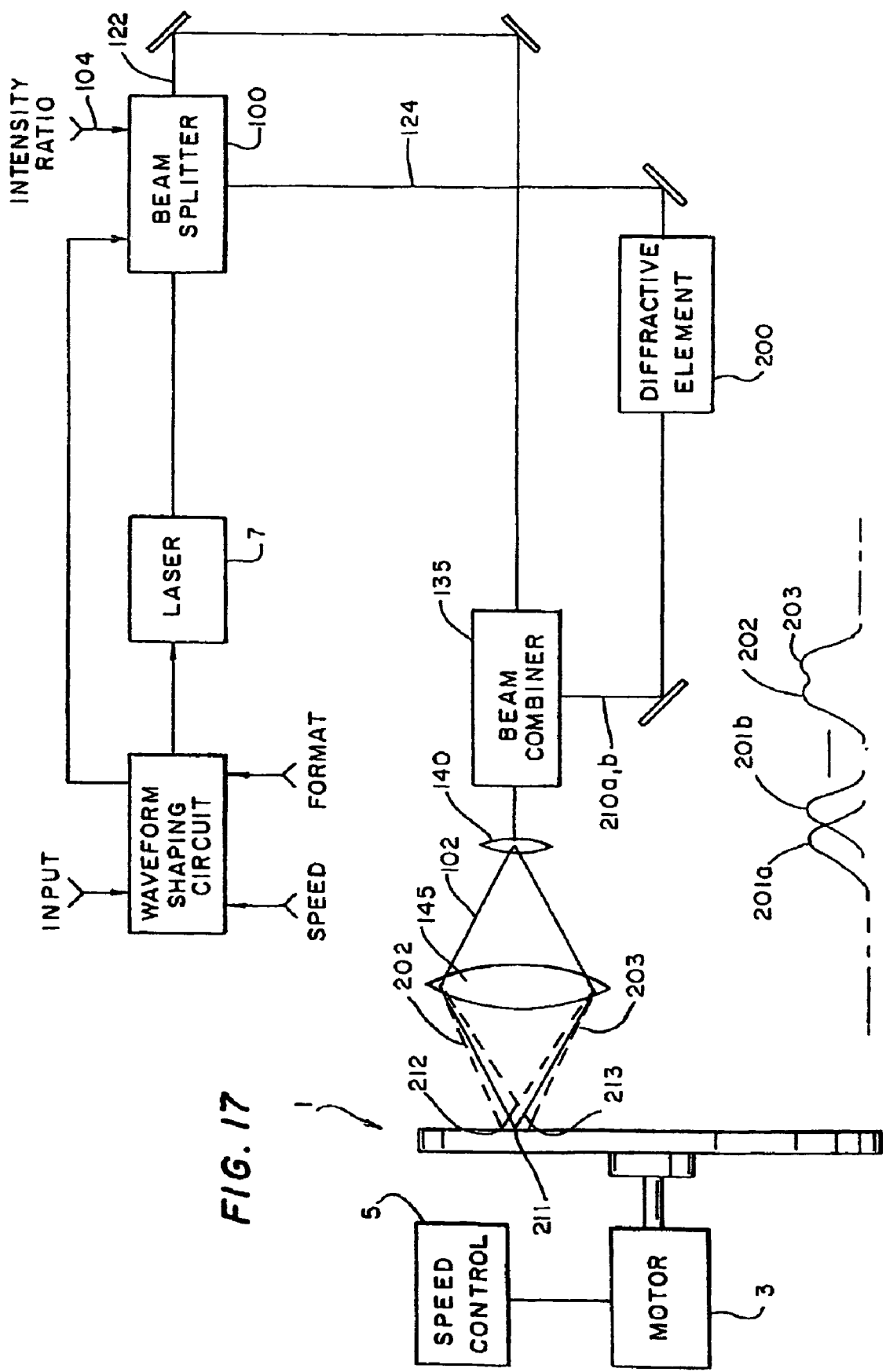
FIG. 17 is a generalized block diagram illustrating the embodiment of the invention shown in FIG. 16, but with an alternative means to create beam spread.

This embodiment is illustrated in FIG. 17, which is based on FIG. 14 (a diode laser embodiment) and in which the relative focal positions of the beams are greatly separated for clarity.

The diode laser embodiment is chosen for simplicity in presentation, it being understood that a gas laser embodiment with external optical modulators could alternatively have formed the basis for FIG. 17, since the nature of the beam source is unimportant in the context of this invention.

Referring now to FIG. 17, the trough-writing beam 124 emerges from the beam splitter 100 and passes through an optical device 200, which, in the preferred embodiment, is a custom-designed diffractive element. Its purpose is to divide the incident beam into a pair of emergent beams 201a,b that are mutually offset slightly. Those with ordinary skill in the art will readily be able to substitute alternative optical devices to accomplish this purpose. As shown in the inset to FIG. 17, because these emergent beams each have an approximately Gaussian intensity cross-section, that small mutual displacement results in a joint beam whose intensity profile (in a sectional plot along the displacement axis) is nearly rectangular, as shown.

The emergent, slightly displaced, beams 201*a,b* are combined with the principal beam 122 in the beam combiner 135, the output of which is passed through the condenser lens 140 and thence through the objective lens 145. Three beams, 102, 202 and 203 are thus focused onto the active surface 43 of the spinning disc 1. Beam 102 is the principal write beam, while beams 202 and 203 are, together, the trough-writing beam. These three beams focus, respectively, at points 211, 212 and 213 on the active surface. It will readily be appreciated that FIG. 17 is drawn out of scale to show detail, where in fact beams 202 and 203 would overlap at the active surface, as shown in the inset and beam 102 would focus in the center of that merger. The result, at the surface, if seen microscopically in plan view, extending radially, would be an elliptical light spot whose intensity is greater at the center (where the pit is written) than at either side (by which the trough is created).

Figure 18:
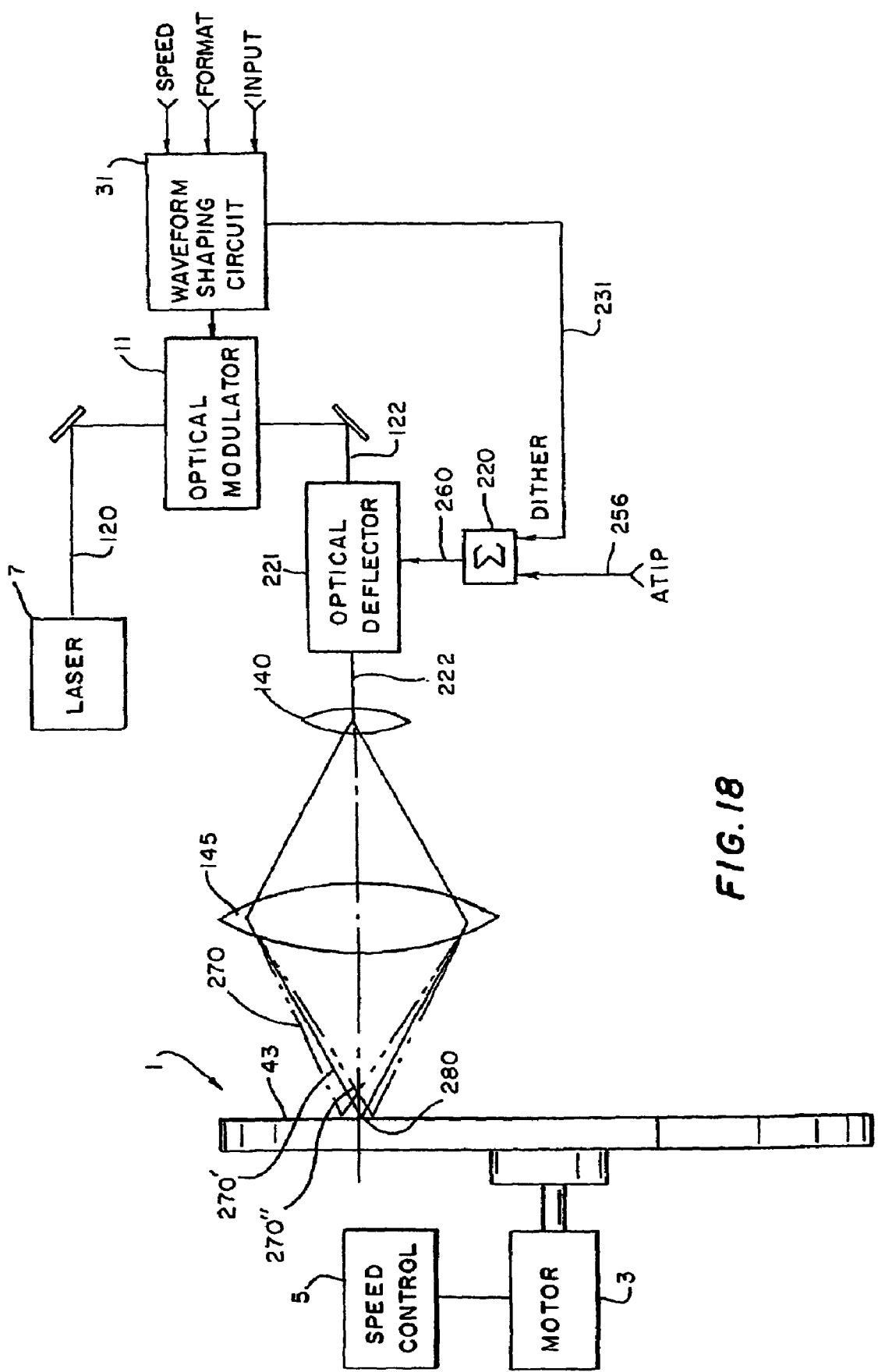
FIG. 18 is a generalized block diagram illustrating an embodiment of the invention illustrating another means to create beam spread.
Figure 19:
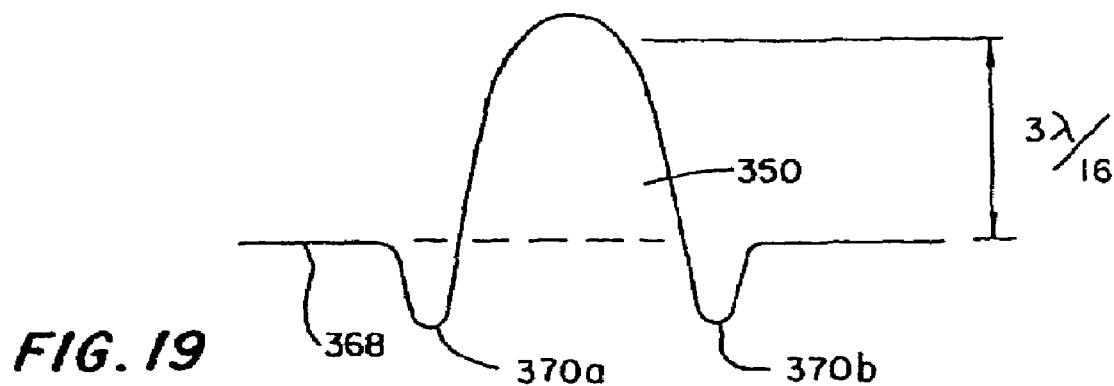
FIG. 19 is a transversely sectional view of a bump resulting from application of the dye-polymer process without the improvements of the invention.

The embodiment shown in FIG. 17 is based on separation of pit-writing and trough-writing beams, 122 and 124, respectively, by means of the beam splitter 100. However, a similar result can be achieved by use of a single beam, as illustrated in FIG. 18.

Here, as in the case of the embodiment illustrated in FIG. 13, the laser 7 emits a beam 120 directed through an optical modulator 11, which is controlled by a waveform shaping circuit 31 whose inputs may include rotational speed, format and data input signals. The output beam 122 from the optical modulator is directed to an optical deflector 221, completely similar to the optical deflector 150 shown in FIG. 15 and described in that context. Its purpose is also similar: to convert beam 122 into an output beam 222 that is selectively dithered in a radial direction relative to the disc (i.e., up and down, in respect to FIG. 18). This selective dither is caused by a dither output signal 231 from the waveform shaping circuit, whose instantaneous amplitude is exactly synchronized with the instantaneous amplitude of the beam 122 emerging from the optical modulator. The dither signal is summed with an ATIP input (activated when the apparatus is in the CD-R mastering mode) by means of a conventional electronic summing device 220, the output of which constitutes the input 260 to the optical deflector. The deflected beam 222 passes through the condenser lens 140 and the objective lens 145, to emerge as the focused beam 270 impinging upon the active surface 43 of the disc 1 at moving point 280. This beam (shown as beam 270, 270' and 270" to indicate motion) traces a complex radial dithering pattern on the disc surface as it rotates, creating the desired pits, bumps, trough, groove and/or ridge in that surface.

Because the dither signal is generated by the same waveform shaping circuit 31 that controls the optical modulator, the input to the waveform shaping circuit will ultimately determine simultaneously the instantaneous intensity and radial position of focused spot from the write beam 270 on the active surface 43, as the disc 1 continually spins. Accordingly, by generating a proper input signal to the waveform shaping circuit—which is well within the capability of the ordinary practitioner, based on the teachings herein, in the references cited and in the literature—an extremely complex trace can be recorded spirally in the active surface of the spinning disc, which can be translated into thousands of reproductions if a stamper is made from the master disc thus created.

For example, this technique might be applied simply to form more precise pits in a track of pits and intervening lands in a CD/DVD master. Here, the beam is narrowly focused to a relatively minute spot, by proper selection of optical parameters and write beam wavelength. While the disc spins, that tiny spot is dithered very rapidly within a range (in a radial direction relative to the disc) corresponding to the width of each pit to be written in the data track. That dithering range changes precisely as the desired width of each pit changes along its length, as it is being written. Between pits in the track, the optical modulator extinguishes the beam until the commencement of the next pit. In a dye-polymer medium, thermal smearing assures that the resultant pits are properly configured in plan and sectional view. But because of the rapid, precisely controlled dither of a relatively minute beam, the resultant pits may be more precisely formed than in the case of a simple write beam following the data track.

In a second example, a track of data pits could be formed within a continuous trough. Here, a second dither signal is superimposed upon (i.e., summed with) the pit-forming dither signal, where the second signal creates the trough in which the sequence of pits and lands will reside on the disc. The trough depth is determined by the beam intensity increment corresponding to trough formation (which would typically be caused to generate an incremental heat influx only slightly above the thermal threshold of the moving medium), and its width is determined by the range of this secondary dither. As mentioned above, by properly controlling the amplitude of the secondary dither, berms could be removed without creation of any substantial trough at all.

As a third example, a track of pits could be formed in the manner described above, with a trough for tracking purposes created only between pits. Here, superimposed upon the pit-forming signal is a trough-forming signal as described in the previous example. However, in this example the trough-forming dither signal is activated only when the pit-forming dither signal is quenched, with perhaps a slight overlap to facilitate tracking, but timed and shaped so as not to obscure pit/land transitions and thus impair HF detection.

In a fourth example, a continuous groove may be created for CD-R mastering applications, by providing a single dither signal of constant dithering range and suitable intensity, upon which an ATIP wobble signal is superimposed.

In all these examples, the dithering range and instantaneous beam amplitude may be controlled by conventional means to produce virtually any pit or groove geometries (or raised bump or ridge geometries) desired. Furthermore, application of the dithering embodiment of the present invention might be expanded by one with ordinary skill in the art, based on these teachings and those in the relevant literature, to improve PR mastering techniques by precisely controlling the three-dimensional extent of photoresist exposure. The latter techniques might also be applied to eliminate some of the inherent roughness characteristic of the PR process and/or to reduce or possibly even to eliminate slope discontinuities in the transverse sectional shape of resulting pits.

For efficiency in describing several embodiments of the invention, FIGS. 13, 16 and 18 have been based on the use of a gas laser, as the write beam, while FIGS. 14, 15 and 17 have been based on the use of a solid-state laser. As mentioned above, gas lasers require external modulation, whereas in solid-state laser implementations the laser itself acts as the summing element for the various input signals combining to produce the desired write beam intensity profile. Of course, each of these embodiments could have been shown, with an equal number of additional figures, in both a gas laser and solid-state laser implementation. However, it is believed that sufficient disclosure has been provided to enable one of ordinary skill in the art to implement all these embodiments, and many others within the scope of this invention, in either a gas or solid-state implementation by providing appropriate circuitry, based on the information provided herein.

While the choice of implementation, whether featuring use of a gas or solid-state laser, is a design choice left to the practitioner, there is at least one significant difference. Since gas laser implementations require external modulation, each beam split from the laser beam may thus be separately modulated. Therefore, based on the embodiment shown in FIG. 13, for example, a write timing differential could be implemented between the data-writing beam 102 and the trough-writing beam 103, by providing conventional beam deflection means, such as a mirror, to cause one of the two beams selectively to focus at a different position along the data track than the other. The beams could thus be caused to coincide, as shown in FIG. 10, or one could be caused to lead the other, as shown in FIGS. 11 and 12. If a solid-state laser were used as the writing beam source, as shown, for example, in FIG. 14, it would be more difficult to accomplish this, without at least providing a coordinated pair of separately modulated lasers or an external modulator for each one.

Figure 20:
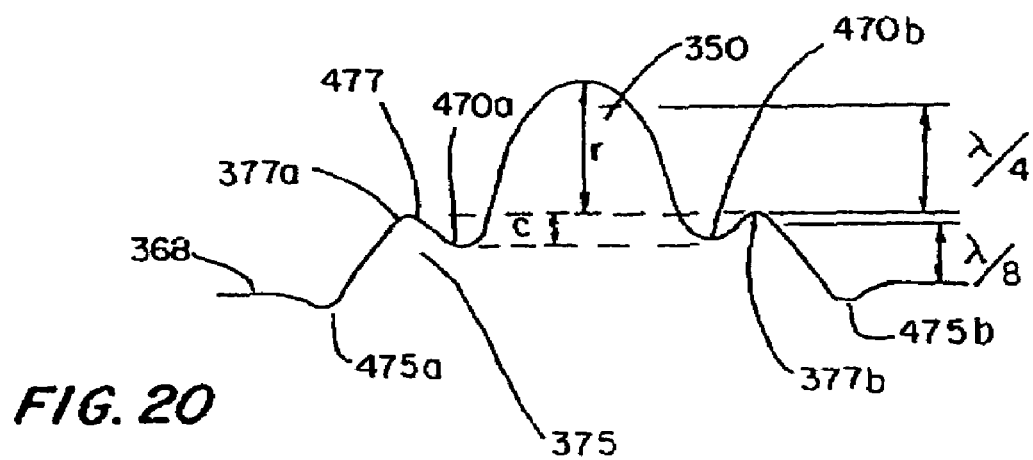
FIG. 20 is a transversely sectional view of a bump according to the invention.
Figure 21:
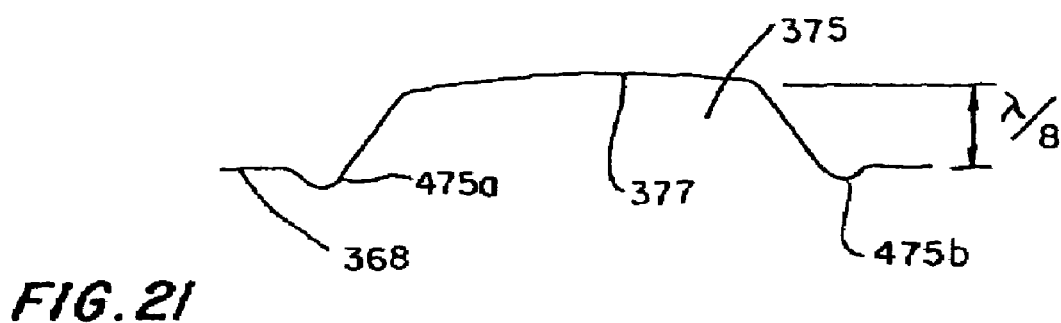
FIG. 21 is a transversely sectional view of a land area mound according to the invention.
Figure 22:
FIG. 22 is a transversely sectional view of a bump superimposed on a mound according to another embodiment of the invention.

FIGS. 19–22 correspond, respectively, to FIGS. 5, 7, 8 and 9, except that FIGS. 19–22 illustrate raised features, rather than indented ones. The reference figures in FIGS. 19–22 correspond to those shown in FIGS. 5, 7, 8 and 9 when identifying corresponding elements, except that each reference numeral is increased by 300 over the corresponding element. Referring to FIG. 20, the bump rise r is compared to the depth of crease c to determine the ratio corresponding to h/d in FIG. 7. It will readily be seen that a relatively large r/c value corresponds to a relatively small h/d value in demonstrating berm reduction according to the present invention.

Once again, a principal goal of the present invention is to increase the Figure of Merit, in various aspects, as discussed above, and this can be accomplished either by improved HF detection or by improved PP detection or both—without compromising any of the other required specifications. Another goal is to provide more accurate replication, by reducing the depth and consequent material-retaining effect of stamper crevices. Since HF detection and replication accuracy are improved by removal (or substantial reduction) of the berms normally generated in the dye-polymer process, any method of accomplishing the latter will satisfy the goal.

It does not appear that the published literature contains substantial reference to these berms, which tend to result naturally in the process of formation of three-dimensional features in optical recording media by thermally based optical recording processes, such as the dye-polymer process. By "thermally based" we refer generally to those processes by which an optical (e.g., laser) or quasi-optical (e.g., ion or electron) beam causes formation of a three-dimensional feature in or on a layer of substantially uniform composition as the result of heat locally generated by the beam. This is in contrast to a purely optical method, such as the PR method, where it is the quantity of light that ultimately effects mark formation, rather than heat generated by the beam; the MO and PC methods, which do not result in formation of three-dimensional features; and concepts as disclosed, for example, in the Feyrer Patents identified above, by which features are generated in a multiple component layer, which is, therefore, non-uniform in composition.

Despite this dearth of literature reference to berm formation in thermally based optical recording processes, those with ordinary skill in the art will, upon consideration of the teachings herein, appreciate that a reduction of berm height would improve HF detection, and will particularly appreciate the great improvement realized if these berms can be virtually eliminated.

We have found that, by employing the techniques of the present invention, as disclosed herein, these berms may be reduced to the point where detection of their vertical departure from an index level becomes quite difficult. In other words, by applying the techniques herein taught, a practitioner of ordinary skill can expect to be able to create three-dimensional features, such as data pits or bumps and tracking grooves, by thermally based optical recording processes that are virtually devoid of berms. By contrast, with reference to pit formation as an example, we have found that application of prior thermally based optical recording techniques, such as the dye-polymer method, apart from these teachings, results in berm formation in which the ratio of berm height to pit depth is at least ⅓ and typically greater. We have not been able, by applying prior art methods, to achieve such a ratio of less than about ¼. Likewise, in examining optical recording media produced by prior art methods, a ratio of less than about ¼ has not been observed, nor does a ratio of less than about ¼ appear in any observed prior art diagrams that purport to display these relative dimensions with reasonable accuracy.

Measuring berm height (h, in FIG. 7) and pit depth (d, in FIG. 7) as opposing vertical distances from an index level (which is defined as the vertical position from which the berm begins to rise at one of its radial extremities: e.g., 177, in FIG. 7), we thus find that a reasonable maximum ratio of berm height to pit depth that would separate the results achieved through application of the techniques taught herein from those achievable through application of the prior art is approximately 25%. That is to say, the techniques taught herein will facilitate production of pits having a berm height to pit depth ratio (measured as indicated) of no more than 25%, while the prior art techniques do not achieve this result. It is particularly clear that a ratio of 10% or even 20% cannot be achieved without application of the techniques taught herein.

As alluded to above, in the case of bump or ridge formation, it is the ratio of bump rise r to crease depth c—i.e., r/c—that must be considered. If respective measurements are taken in the same vertical direction as in the corresponding case of the berm/pit ratio, h/d, then desirable values of c/r would be the reciprocal of corresponding values of h/d. Thus, in the bump/crease situation, where the desired feature rises above the index level, it is the minimum ratio of c/r that separates the results achievable by the present invention from those obtained by application of the prior art. Therefore, the dividing ratio, in the case of bump formation, is 4, with greater values of this ratio indicating further improvement brought about by the present invention. That is to say, a bump/crease ratio r/c of 4 or more corresponds to a berm/pit ratio h/d of 25% or less, and so on.

Accordingly, if the type of three-dimensional feature is not considered, but the ratio is consistently calculated by a rise divided by a depression, this invention is distinguished from the prior art, generally, by values of this ratio of less than 25% and more than 4, with intermediate values relegated to the prior art.

Of course, optical data recordings by the PR method typically display no berms or creases at all, because that process is not a thermally based process and no material expulsion takes place in formation of three-dimensional marks by that method. Since that process resides in the prior art, optical recording structures according to the present invention must be distinguished from the natural results of employing the PR method. This may be accomplished in a number of ways, such as, for example, by expressing a limitation referring to a thermally based optical recording method by which the structure is produced, which would certainly exclude PR.

Additionally, even if the method of production of the three-dimensional features is not specified, the fact that thermally based methods produce such features having a transverse section displaying no substantial slope discontinuity will tend to distinguish those produced by the PR method from those produced by thermally based methods. This would certainly distinguish the masters and stampers produced by the respective methods, since the three-dimensional features in PR masters and stampers display angular corners, due to the fact that they result from an etching process. However, when replicated by less than precise procedures, PR-generated discs may contain three-dimensional features that display the smoother sectional contours more characteristic of thermally based methods. And yet such replicas will typically display no berms or creases at all.

Accordingly, in the specific case where the method of production is not identified, it may be necessary, in distinguishing, from the prior art, optical recording structures characterized by the present invention, to exclude substantially zero values of the h/d ratio and substantially infinite values of the corresponding r/c ratio.

Although the dye-polymer process inherently tends to promote berm formation, which is alleviated by the foregoing embodiments of the invention, the fact that this process also tends to produce smoothly surfaced pits of continuous slope is advantageous, if well controlled.

We have observed that the bonding structure of the polymer utilized in forming the active dye-polymer layer has a profound effect on the extent to which berms will be generated by expulsion in the dye-polymer optical data recording process. In particular, we have discovered that careful management of the polymerization process, itself, by proper selection of the constituent monomer(s) and selective cross-linking can produce a dye-polymer mixture which, when applied as the active layer 43, will greatly reduce, if not entirely eliminate, the berm-production problem, while still maintaining the desired smoothness and slope continuity.

It has been observed, in particular, that long-chain polymers, such as ordinary nitrocellulose, display an apparent tendency to slide in respect to one another within the optical surface—i.e., to plasticize—when the thermal threshold of the moving medium is exceeded during the dye-polymer writing process. This contributes greatly to berm-formation, in that the molten or softened material tends to flow upward out of the formed pit and to re-solidify as berms at the upper margin of the pit. Such thermo-plastic polymers, commonly utilized in the past in dye-polymer optical disc writing applications, appear not to be ideally suited for the purpose.

On the other hand, thermo-setting polymers—i.e., those which harden, rather than soften, upon selective application of heat, offer advantages.

In general, we have observed that if monomers with inherently weak bonds are selected and properly polymerized, the other, more desirable elements comprising the expulsion process can be made to occur before plasticization occurs. We have also discovered that selective cross-linking, even of conventionally employed monomers, such as nitrocellulose, in the polymerization process can achieve a similarly beneficial result, by effectively converting an ordinarily thermoplastic polymer into a more thermo-setting polymer. The result has been a significant reduction in berm height amounting, in certain cases, to virtual elimination of berms.

Through our empirical studies, the following appear to be particularly advantageous:

(1) Use of an appropriate ultraviolet (UV) curing resin. According to this method, generally, the optically active surface comprises an acrylic or polyester resin with suitable UV initiators; a dye constituting less than 30% of the resulting mixture, by weight, whose color is complementary to the write laser color (as discussed above); and a suitable solvent—for example, acetone, MEK, toluene, xylene and/or butyl cellosolve—of sufficient quantity to yield a mixture that can readily be spin-coated onto the disc master substrate. Once spin-coated onto the substrate and dried, the surface is exposed to UV light for double the amount of time suggested in the manufacturer's specifications, to yield a surface whose heat threshold for plasticity substantially exceeds its threshold for decomposition. Specifically, the proportions in Example (1), by weight, are: Diacure SD-17 acrylic oligomer (30%); dye (2%); butyl cellosolve (68%).

(2) Use of a catalytically cured resin. In general, a polyurethane or polyester resin, or a combination of both such monomers, is mixed with a dye whose color is complementary to that of the write laser. As in Example (1), the weight of the dye is less than 30% of the total weight of the mixture. A suitable catalyst—e.g., benzoyl peroxide in a quantity less than 1% of total mixture weight—is added. The resulting combination is dissolved in a suitable solvent—see, Examples (1) for a few candidate solvents—and spin-coated onto the substrate. As the surface dries, it cures into an optically active surface whose threshold properties are comparable to those indicated in Example (1). The proportions in Example (2) are: Desmophen R221 polyester resin (73 grams); Desmodur N100 (27 grams); Zinc octoate (0.2 gram); butyl cellosolve (120 grams); dye (10 grams).

(3) Use of a thermally cured resin. In general, urethane, melamine and/or phenolic pre-polymer(s) is/are mixed with a dye of suitable color and quantity (see, Examples (1) and (2)). The resulting mixture is dissolved a suitable solvent, selected from the group identified in Example (1), and/or alcohol and/or suitable ester(s), to yield a mixture that can readily be spin-coated onto the substrate. After spin coating is accomplished, the disc master is baked at a temperature range of approximately 150° to 200° C. for approximately ½ hours. The proportions in Example (3) are: Reichold Beckamine #21–505 (10 grams); dye (1 gram); butyl cellosolve (89 grams).

These examples are given only to illustrate three principal methods by which a suitable optically active surface of substantially uniform composition may be applied to the disc master, the criterion being that the resulting surface is to display a thermal threshold for initiation of plasticity that is sufficiently higher than its threshold for decomposition, so that pit-writing upon the surface is accomplished with minimal plasticization of the surface to cause berm formation by flow out of the created pit. Preferably, just enough plasticization will occur to promote smooth contours.

Figure 23:
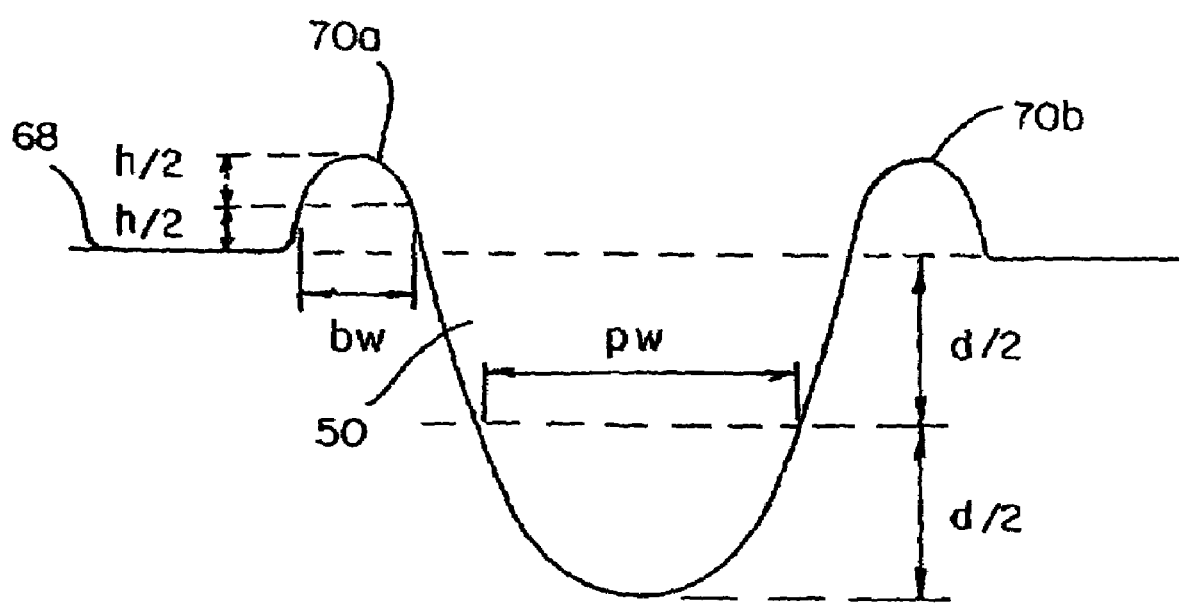
FIG. 23 is a transversely sectional view of a pit, illustrating berm width reduction.

Indeed, we have discovered that if the threshold for decomposition is only somewhat below the threshold for plasticization, berm height and width reduction will occur together. Such a reduction in berm width will reduce cross talk between radially adjacent track portions, and will also reduce the effects that writing upon a track portion can have on the radially adjacent portions. Referring to FIG. 23, the three examples specified above have been found to result in a berm whose width bw, measured at half-height h/2, is approximately 100 nanometers or less, which is considerably less than the typically 120+nanometer berm width achievable with prior formulations. And as noted, this berm width reduction occurs with a corresponding reduction in berm height.

We have also discovered that substantial reduction in berm height and width may particularly be achieved if full cross-linking is promoted by increasing cure times and cure temperatures, in thermally or ultraviolet cured polymers, and by employing an additional quantity of catalyst, in catalytically cured formulations—well beyond the manufacturers' specifications. Such increases are incorporated into the above examples. Specifically, we have found, in these examples, that doubling the specified cure times and increasing cure temperatures to beyond the upper limit of the specification curves, and doubling the proportion of specified catalyst will each result in particularly substantial reductions in berm dimensions. These full cross-linking techniques and the dual thermal threshold criteria independently improve berm reduction. When employed together, they will even further enhance it.

Within the dual thermal threshold criteria, with or without the additional suggested steps to achieve substantially full cross-linking, and based on the teachings provided in the Examples given, it is believed that an operator of ordinary skill in the art to which this aspect of the invention pertains could readily experiment to develop detailed methods suitable to the particular application for which the operator is employed. For example, other solvents could be employed, alone or in any desired combination; the particular dye(s) could be selected as desired (or eliminated, if a beam of sufficient power is utilized, as discussed above); the various constituent monomers or other pre-polymers could be selected or combined, or other types could be substituted, to achieve the desired result; other catalysts could be selected; drying and curing time(s) and/or condition(s) could be changed as desired. Alternatively, a chemically cured resin might be utilized, or other energy sources (e.g., radioactivity) might be employed for curing. Further changes could also be introduced into any of the methods described in the Examples, which are meant only to illustrate means that have been shown, through empirical testing, to accomplish the desired result.

While such scrupulous selection of the candidate monomer(s) or other pre-polymers and cross-linking processes will provide improved results and may, indeed, even eliminate berm-formation during dye-polymer optical data recording without addition of a trough to "burn off" residual berms, the overall result of improved Figure of Merit may be augmented if these are used in association. And the trough-forming expedient would provide similar improvement in PP detection, as described above, whether or not it were used for reduction or removal of berms, per se. Accordingly, the polymerization and trough-writing procedures should be considered as companion solutions to the same problems.

Thus far, major emphasis has been placed on dye-polymer optical data recording. However, the concepts underlying this invention are by no means limited to that method. Indeed, they can be applied to virtually any method of optical data recording based on generation and detection of three-dimensional marks. For example, they can be applied to PR, which is not a thermal process at all.

Recalling that PP detection is a major constituent of Figure of Merit, the same problem of the PP-HF conflict exists in PR disc recording. Any improvement that can be made in either HF or PP detection in the PR arena would improve the Figure of Merit. And the concepts underlying the present invention can provide just such improvements.

It has been noted that even though the PR method is not a thermally based method, it does involve a threshold, in this case an optical threshold. Like the thermal dye-polymer process, this threshold, once met will initiate the processes causing in pit formation. In the case of PR, if the incident light intensity is just above the optical threshold of the moving medium, exposure of the photoresist will occur at a very shallow level. As the light intensity is increased, so will the depth of exposure and, consequently, the pit depth after development. That being the case, the trough-writing beam, described above, can be used optically in the PR process to achieve results that correspond to those achieved thermally in the dye-polymer situation. Thus, if, in the PR optical data recording process, the write beam is split into a pit exposure beam and a trough exposure beam, a dual-component radial configuration will result in the final disc, just as in the dye-polymer case. Also, just as in the dye-polymer case, described in detail above, this trough-exposure beam could be focused to a larger size with less intensity than the pit-exposure beam, or it could be focused narrowly and intensely, and dithered or separated into a plurality of narrowly-spaced, overlapping beams. Alternatively, a single, complexly dithered beam could be employed. The apparatus for accomplishing these results would be virtually identical to those illustrated and described herein in respect to the dye-polymer situation, and need not, therefore, be separately explored. Certainly, there would be differences, but these would be well within the ability of the ordinary practitioner to implement.

Indented features (e.g., pits and grooves) have been the principal subject of the discussion thus far. However, the same considerations likewise apply to formation of projecting marks, such as bumps, mounds or ridges. Apparatus and methods to generate such raised features need not be discussed separately, because a CD-ROM/DVD-ROM stamper or CD-R/DVD-R master is the complementary (i.e., mirror) image of the master into which pits, troughs or grooves, respectively, will have been introduced by the apparatus and methods described. Therefore, the methods and apparatus described in connection with pit, trough and groove formation likewise result in bump, mound and ridge formation.

As has been previously mentioned, raised features may be created nearly as easily as indented features, merely by properly inverting and otherwise processing the waveform that controls the intensity of the beam impinging on the active surface of the optical recording structure. By this general method, raised features remain when the remainder of the surface is expelled away.

Undoubtedly, other methods exist, based on or closely related to, the teachings herein, whereby such raised features can be directly created in an optical storage structure. But these are believed to be within the skill of the ordinary practitioner, based on the teachings herein, and would not constitute a departure from the present invention, in its proper scope and breadth.

In the PR situation, raised features can be generated in a disc or a disc master merely by selecting the photoresist material as one which, when exposed and developed, will cause all but the exposed areas to be removed. Such a selection process is commonly made and well understood in the art. Thus, application of the present teachings to PR optical data recording and disc mastering with raised features is particularly simple, even in respect to provision of a tracking ridge, which would require only the type of secondary, near-optical-threshold exposure described above.

Of course, the write and read beams can likewise originate with other than laser sources. For example, electron beams or ion beams could be thus employed. And there will undoubtedly be other beam sources applicable to the present invention, some of which may await future scientific development for their realization. But any and all of these laser alternatives would likewise fall within the scope of the present invention, and their implementation by necessarily altered apparatus and/or methods would likely constitute no more than the equivalent of the invention as claimed.

Finally, it should be noted that the improvements of the invention may be observed not only in master optical recording structures, but also in stampers replicated from such masters and in structures replicated from such stampers, as intermediary structures, or directly from such masters. Since all such replicas, whether intermediary or final, will display the improved features of the invention, all would fall within the inventive concept.

Many alternations and modifications may be made by those having ordinary skill in the art without departing from the spirit and scope of the invention. Therefore, it must be understood that the illustrated and described embodiments have been set forth only for the purpose of example and that these should not be taken as limiting the invention as defined by the claims which follow.

The words used in this Specification to describe the invention and its various embodiments are to be understood not only in the sense of their commonly defined meanings, but also to include, by special definition in this Specification, structures, materials or acts beyond the scope of the commonly defined meanings. Thus if an element can be understood in the context of this Specification as including more than one meaning, then its use in a claim must be understood as being generic to all possible meanings supported by the Specification and by the word itself.

The definitions of the words or elements of the following claims, therefore, include not only the combination of elements which are literally set forth, but all equivalent structures, materials or acts for performing substantially the same function in substantially the same way to obtain substantially the same result.

Insubstantial departures from the claimed subject matter as viewed by a person with ordinary skill in the art, now known or later devised, are expressly contemplated as being equivalently within the scope of the claims, even though not performing exactly the same function in substantially the same way to obtain substantially the same result. Therefore, substitutions now or later known to one with ordinary skill in the art will be within the scope of the defined elements.

The claims are thus understood to include what is specifically illustrated and described above, what is conceptually equivalent, what can be obviously substituted and also what essentially incorporates the essential idea of the invention.

We claim:

1. A structure for storing selectively retrievable data comprising a data layer of substantially uniform composition, said data layer having:
   a. a first level;
   b. a second level substantially parallel to said first level and vertically displaced from said first level in a first direction;
   c. a third level substantially parallel to said second level and vertically displaced from said second level in said first direction;
   d. a first feature, said first feature elongated and three-dimensional, at least a portion of said first feature vertically extending from said second level to said third level, said first feature having a first principal axis substantially parallel to said second level, a transverse axis substantially normal to said first principal axis and parallel to said second level, and a vertical axis substantially normal both to said first principal axis and to said second level, said first feature characterized in that:
      (1) the transverse extent of said first feature is less at said third level than at said second level;
      (2) the transverse extent of said first feature at said second level, measured from one side of said first feature to the opposite side of said first feature, including any displacement of said first feature from said second level in a second vertical direction opposite said first direction, is microscopic;
      (3) the length of said first feature from one end of said first feature to the opposite end of said first feature, along said principal axis, including any displacement of said first feature in said opposite vertical direction, is not more than approximately 4 microns; and
      (4) the outer shape of said first feature, defined by a transverse section thereof, displays no substantial slope discontinuity from the point at which said first feature begins its displacement from said second level, at one transverse edge of said feature, until the point at which said displacement from said second level ends at the opposite transverse edge of said first feature; and
   e. a second feature, wherein:
      (1) said second feature comprises an elongated, three-dimensional region extending from said first level to said second level, a portion of said elongated region having a second principal axis substantially parallel to, and approximately aligned transversely with, said first principal axis;
      (2) the transverse extent of said second feature is less at said second level than at said first level; and
      (3) the transverse extent of said second feature at said first level, measured from one side of said second feature to the opposite side of said second feature, including any displacement of said second feature in said opposite vertical direction, is not substantially less than said transverse extent of said first feature.

2. The structure as recited in claim 1, wherein said transverse extent of said first feature is contained within said transverse extent of said second feature.

3. A secondary structure, at least a plurality of whose features substantially accurately replicate corresponding features of the structure recited in claim 2.

4. The structure as recited in claim 1, wherein at least a portion of said second feature is longitudinally displaced from said first feature.

5. A secondary structure, at least a plurality of whose features substantially accurately replicate corresponding features of the structure recited in claim 1.

6. The structure as recited in claim 1, comprising an elongated data track, at least a portion of said data track being substantially longitudinal and having a third principal axis extending in a direction normal to said first direction, said first and second principal axes each being substantially parallel to, and approximately aligned transversely with, said third principal axis.

7. The structure as recited in claim 6, wherein said first, second and third principal axes are transversely aligned.

8. The structure as recited in claim 6, wherein said transverse extent of said first feature is contained within said transverse extent of said second feature.

9. The structure as recited in claim 1, wherein the outer transverse profile of said second feature, from the point at which said second feature begins its displacement from said first level, at one side of said second feature, until the point at which said displacement from said first level ends at the opposite side of said second feature, including any portion thereof extending in said opposite vertical direction, displays no substantial slope discontinuity.

10. A secondary structure, at least a plurality of whose features substantially accurately replicate corresponding features of the structure recited in claim 9.

11. The structure as recited in claim 1, wherein the outer transverse profile of said second feature, from the point at which said second feature begins its displacement from said first level, at one side of said second feature, until the point at which said displacement from said first level ends at the opposite side of said second feature, including any portion thereof extending in said opposite vertical direction, displays no substantial surface roughness.

12. A secondary structure, at least a plurality of whose features substantially accurately replicate corresponding features of the structure recited in claim 11.

13. A structure for storing selectively retrievable data comprising a data layer of substantially uniform composition, said data layer having:
　a. a first level;
　b. a second level substantially parallel to said first level and vertically displaced from said first level in a first direction;
　c. a third level substantially parallel to said second level and vertically displaced from said second level in said first direction;
　d. a first feature, said first feature elongated and three-dimensional, at least a portion of said first feature vertically extending from said second level to said third level, said first feature having a first principal axis substantially parallel to said second level, a transverse axis substantially normal to said first principal axis and parallel to said second level, and a vertical axis substantially normal both to said first principal axis and to said second level, said first feature characterized in that:
　　(1) the transverse extent of said first feature is less at said third level than at said second level;
　　(2) the transverse extent of said first feature at said second level, measured from one side of said first feature to the opposite side of said first feature, including any displacement of said first feature from said second level in a second vertical direction opposite said first direction, is microscopic;
　　(3) the length of said first feature from one end of said first feature to the opposite end of said first feature, along said principal axis, including any displacement of said first feature in said opposite vertical direction, is not more than approximately 4 microns; and
　　(4) wherein the outer transverse profile of said first feature, from the point at which said first feature begins its displacement from said second level, at one side of said first feature, until the point at which said displacement from said second level ends at the opposite side of said first feature, including any portion thereof extending in said opposite vertical direction, displays no substantial surface roughness; and
　e. a second feature, wherein:
　　(1) said second feature comprises an elongated, three-dimensional region extending from said first level to said second level, a portion of said elongated region having a second principal axis substantially parallel to, and approximately aligned transversely with, said first principal axis;
　　(2) the transverse extent of said second feature is less at said second level than at said first level; and
　　(3) the transverse extent of said second feature at said first level, measured from one side of said second feature to the opposite side of said second feature, including any displacement of said second feature in said opposite vertical direction, is not substantially less than said transverse extent of said first feature.

14. A structure for storing selectively retrievable data comprising a data layer of substantially uniform composition, said data layer having:
　a. a first level;
　b. a second level substantially parallel to said first level and vertically displaced from said first level in a first direction;
　c. a third level substantially parallel to said second level and vertically displaced from said second level in said first direction;
　d. a first feature, said first feature elongated and three-dimensional, at least a portion of said first feature vertically extending from said second level to said third level, said first feature having a first principal axis substantially parallel to said second level, a transverse axis substantially normal to said first principal axis and parallel to said second level, and a vertical axis substantially normal both to said first principal axis and to said second level, said first feature characterized in that:
　　(1) the transverse extent of said first feature is less at said third level than at said second level;
　　(2) the transverse extent of said first feature at said second level, measured from one side of said first feature to the opposite side of said first feature, including any displacement of said first feature from said second level in a second vertical direction opposite said first direction, is microscopic;
　　(3) the length of said first feature from one end of said first feature to the opposite end of said first feature, along said principal axis, including any displacement of said first feature in said opposite vertical direction, is not more than approximately 4 microns; and
　　(4) wherein the outer transverse profile of said first feature, from the point at which said first feature begins its displacement from said second level, at one side of said first feature, until the point at which said displacement from said second level ends at the opposite side of said first feature, including any portion thereof extending in said opposite vertical direction, displays no substantial surface roughness; and e. a second feature, wherein:
   (1) said second feature comprises an elongated, three-dimensional region extending from said first level to said second level, a portion of said elongated region having a second principal axis substantially parallel to, and approximately aligned transversely with, said first principal axis;
   (2) the transverse extent of said second feature is less at said second level than at said first level;
   (3) the transverse extent of said second feature at said first level, measured from one side of said second feature to the opposite side of said second feature, including any displacement of said second feature in said opposite vertical direction, is not substantially less than said transverse extent of said first feature; and
   (4) wherein the outer transverse profile of said second feature, from the point at which said second feature begins its displacement from said first level, at one side of said second feature, until the point at which said displacement from said first level ends at the opposite side of said second feature, including any portion thereof extending in said opposite vertical direction, displays no substantial surface roughness.

* * * * *